US012400252B2

(12) United States Patent
Vinod et al.

(10) Patent No.: US 12,400,252 B2
(45) Date of Patent: Aug. 26, 2025

(54) ARTIFICIAL INTELLIGENCE BASED TRANSACTIONS CONTEXTUALIZATION PLATFORM

(71) Applicant: ExlService Holdings, Inc., New York, NY (US)

(72) Inventors: Vivek Vinod, Livingston, NJ (US); Shantanu Paliwal, Woodridge, NJ (US); Abhinav Agarwal, Gurugram (IN); Nikhil Ahuja, Gurugram (IN); S K Praveen, Bengaluru (IN)

(73) Assignee: ExlService Holdings, Inc., New York, NY (US)

( * ) Notice: Subject to any disclaimer, the term of this patent is extended or adjusted under 35 U.S.C. 154(b) by 0 days.

(21) Appl. No.: 18/387,799

(22) Filed: Nov. 7, 2023

(65) Prior Publication Data

US 2025/0148515 A1  May 8, 2025

(51) Int. Cl.
*G06Q 30/0601* (2023.01)
*G06N 7/02* (2006.01)
*G06N 20/00* (2019.01)

(52) U.S. Cl.
CPC ........... *G06Q 30/0623* (2013.01); *G06N 7/02* (2013.01); *G06N 20/00* (2019.01)

(58) Field of Classification Search
CPC .......... G06N 7/02; G06N 20/00; G06N 5/048; G06N 5/045; G06Q 30/0623; G06Q 10/0875; G06F 16/215; G06F 16/2468
See application file for complete search history.

(56) References Cited

U.S. PATENT DOCUMENTS

| 5,742,638 | A | * | 4/1998 | Smith | H04W 48/12 |
| | | | | | 455/503 |
| 6,463,465 | B1 | * | 10/2002 | Nieuwejaar | H04L 67/1001 |
| | | | | | 709/212 |
| 10,984,340 | B2 | * | 4/2021 | Hsiao | G06N 20/20 |
| 11,942,286 | B2 | | 3/2024 | Liu et al. | |
| 2005/0262136 | A1 | * | 11/2005 | Lloyd | G06F 11/3495 |
| 2016/0055427 | A1 | * | 2/2016 | Adjaoute | G06Q 30/0201 |
| | | | | | 706/12 |
| 2020/0272915 | A1 | * | 8/2020 | Tata | G06F 16/35 |
| 2021/0390458 | A1 | * | 12/2021 | Blumstein | G06N 20/00 |
| 2022/0050695 | A1 | * | 2/2022 | Gajendran | G06N 20/00 |

(Continued)

*Primary Examiner* — Usmaan Saeed
*Assistant Examiner* — Tewodros E Mengistu
(74) *Attorney, Agent, or Firm* — Perkins Coie LLP

(57) ABSTRACT

A data analytics and contextualization platform instance acquires an input dataset. Using fuzzy logic, the platform generates a set of contextual items based on the unstructured textual data. Items in the input dataset are labeled using contextual items. Using a labeled particular item, a set of entity behavior maps can be generated to include one or more features selected based on a first particular label of the particular item. One or more AI/ML modeling operations can be selected based on a type of the entity behavior map and performed for items in the entity behavior map. A particular first subset of AI/ML modeling operations can be performed, using a particular contextual item as a trigger, in parallel relative to a particular second subset of AI/ML modeling operations. The entity behavior map, which can be populated using outputs of the AI/ML operations, can be transmitted to a target computing system.

21 Claims, 19 Drawing Sheets

(56) References Cited

U.S. PATENT DOCUMENTS

2022/0140841 A1\* 5/2022 Negishi ............... H03M 7/6011
                                                    341/50
2023/0004428 A1\* 1/2023 Biri ..................... G06F 9/4843
2023/0059494 A1\* 2/2023 Hunter ................. G06F 40/279

\* cited by examiner

```
"data":
[
0:{
 "Transaction_ID":1
 "Customer_ID":"C1"
 "Account_ID":"A1C1"
 "Transaction Type":"CREDIT"
 "Description":"AMEX DES:UPS PMT ID:XXXXXXX INDN: ABC & ASSOCIATES IN CO ID:XXXXX CCD"
 "Txnamount":6157.64
 "Txndate":"2022-05-12"
 "Availablebalance":286528.44
},                                 ⎬ 192a
1:{
 "Transaction_ID":2
 "Customer_ID":"C1"
 "Account_ID":"A1C1"
 "Transaction Type":"DEBIT"
 "Description":"CHECK"
 "Txnamount":22.99|
 "Txndate":"2022-05-13"
 "Availablebalance":286551.43
},                                 ⎬ 192b
2:{
 "Transaction_ID":3
 "Customer_ID":"C1"
 "Account_ID":"A1C1"
 "Transaction Type":"DEBIT"
 "Description":"CHECK"
 "Txnamount":170.94
 "Txndate":"2022-05-13"
 "Availablebalance":286722.37
}]                                 ⎬ 192c
```

```
[{
"Customer_ID": "C1",
"Transaction_ID": 1,
"Account_ID": "A1C1",
"TransactionType": "CREDIT",
"Description": "AMEX DES:UPS PMT ID:XXXXXXX INDN:ABC & ASSOCIATES IN CCD",
"Txnamount": 6157.64,
"Txndate": "2022-05-12 00:00:00",
"TransactionCategoryD1": "CHARGE VOLUME",
"TransactionCategoryD2": "PROCESSOR CV",
"TransactionCategoryD3": "PAYMENT NETWORK",
"VendorName": null,
"InstitutionName": "AMERICAN EXPRESS",
"RecurrenceType":3,
"RecurrenceFrequency": "daily",
"IndAutoPay":0,
"Channel": "Ach/Electronic Transfer",
"City": null, "Sate" : null } ]
```

```
{
  "Customer_ID": "C1",
  "AutoLoanIndicator": 1,
  "BusinessLoanIndicator": 1,
  "CashInHandDays": 31,
  "CoefVarCreditCount": 0.16,
  "CoefVarDebitCount": 0.11,
  "CoefVarRevenue": 0.17,
  "CommercialLoyaltyIndex": 1,
  "CommercialRiskIndex": 3,
  "DebtRepaymentMonth1": 47255,
  "DollarATMCredit": 10220,
  "DSCR1": 0.1,
  "Electricity/Gas/PowerPaymentCount": 4,
  "GrossProfitL1byP1": 0.65,
  "InsuranceIndicator": 0,
  "MOMTotalDebtRepayment1": 0.727,
  "MortgageIndicator": 0,
  "NSFCountTotal": 2,
  "NSFLastDays": 37,
  "NSFTotalAmount": 70,
  "NumBranchCredit": 21,
  "NumDigitalWalletDebitMonth1": 0,
  "NumLoanCredits": 9,
  "NumLoanCreditsMonth1": 1,
  "OverdraftLimit": 0,
  "PayrollFrequency": others,
}
```
⎫ 198

FIG. 1E

| Description | Amount | Date | Category: Level 1 | Institution Name | Category: Level 2 | Category: Level 3 | Recurrence Type | Recurrence Frequency | |
|---|---|---|---|---|---|---|---|---|---|
| AMZNIQ2HYU6L MARKETPLAC xxxHVC7H CCD ID: xx246 | $503 | 1-Jul | Charge Volume | AMAZON | Non processor CV | E-commerce | NA | NA | • Revenue sources and stability |
| AMEX UPS PMT xx295 CCD ID: XX49 | $890 | 1-Jul | Charge Volume | AMERICAN EXPRESS | Processor CV | Payment Network | NA | NA | |
| AMERICAN EXPRESS ACH PMT W4320 WEB ID: xx11 | ($6,000) | 5-Jul | Debt obligation | AMERICAN EXPRESS | Credit Card Payment | Credit Card Payment | NA | NA | • Payments towards financial tradelines and relationships |
| 07/03 PAYMENT TO CHASE CARD ENDING IN 1573 | ($10,000) | 5-Jul | Debt obligation | JP MORGAN CHASE | Credit Card Payment | Credit Card Payment | NA | NA | • Share of wallet and need |
| GEXA ENERGY ELECPAYMNT NONE PPD ID: xx923 | ($1,144) | 2-Aug | Bill Payment | GEXA ENERGY | Utilities | Electricity/ Gas/ Power | NA | NA | • Consistent electricity payment |
| KABBAGE INC LOAN 50974 PPD ID: xxxxx | $75,000 | 28-May | Loan Funding | KABBAGE | Business Loan Funding | Non-Traditional Lender | NA | NA | • New business loan deposit |
| KABBAGE INC PAYMENT 50974 CCD ID: xxx761 | ($11,007) | 15-Jul | Debt obligation | KABBAGE | Business Loan Payment | Non-Traditional Lender | Desc & Freq | Monthly | • Recurrence (monthly) payment towards business loan (Kabbage) |
| KABBAGE INC PAYMENT 50974 CCD ID: xxx761 | ($11,007) | 15-Aug | Debt obligation | KABBAGE | Business Loan Payment | Non-Traditional Lender | Desc & Freq | Monthly | |
| KABBAGE INC PAYMENT 50974 CCD ID: xxx761 | ($14,082) | 14-Sep | Debt obligation | KABBAGE | Business Loan Payment | Non-Traditional Lender | Desc & Freq | Monthly | • Payment amount increase from $11K to $14K |
| ROCKET RECEIVABLES ONLINE PAYMENT xx21 WEB ID: xx | ($445) | 2-Oct | Debt Payment | ROCKET RECEIVABLES | Collection Agency | Collection Agency | NA | NA | • Payment to collection agency |

FIG. 2C

| | Tradeline Subtype | Institution | Recurrence Type | Recurrence Frequency | Payment M1 | Payment M2 | Payment M3 | Payment M4 | Payment M5 | Payment M6 | Last Payment Amount | Avg. payment transaction size | Share of Payment |
|---|---|---|---|---|---|---|---|---|---|---|---|---|---|
| Financial Tradelines | AUTO LOAN PAYMENT | HONDA FINANCE | Both Amount & Time | Monthly | $1,125 | | $375 | $375 | $375 | $375 | $1,125 | $375 | 100% |
| | CREDIT CARD PAYMENT | JP MORGAN CHASE | None | None | $44,882 | $41,055 | $48,071 | $39,862 | $27,876 | $62,698 | $5,124 | $3,707 | 15% |
| | | JP MORGAN CHASE | None | None | $101,603 | $58,217 | $51,499 | $25,840 | $18,550 | $22,431 | $10,000 | $4,427 | 24% |
| | | AMERICAN EXPRESS | None | None | $7,500 | $8,640 | $114,174 | $80,173 | $68,996 | | $8,000 | $4,000 | 56% |
| | | CAPITAL ONE | None | None | $7,090 | | $15,500 | $3,546 | | | $7,500 | $5,023 | 4% |
| | | CITI BANK | None | None | | | | $3,104 | $95 | | $1,090 | $2,097 | 1% |
| | BUSINESS LOAN PAYMENT | KABBAGE | Only Time | Monthly | $20,732 | $17,686 | $18,097 | $14,082 | $11,007 | $11,007 | $20,732 | $15,884 | 39% |
| | | ONDECK | None | None | $24,100 | $19,914 | $36,626 | $19,620 | $23,980 | $21,800 | $1,090 | $1,090 | 61% |
| | | SHOPIFY | Both Amount & Time | Weekly | $225 | | | | | | $44 | $44 | 0% |
| | | SHOPIFY | None | None | $1,448 | $114 | | | | | $37 | $34 | 1% |

| | Tradeline Subtype | Institution | Recurrence Type | Recurrence Frequency | Payment M1 | Payment M2 | Payment M3 | Payment M4 | Payment M5 | Payment M6 | Last Payment Amount | Avg. payment transaction size | Share of Payment |
|---|---|---|---|---|---|---|---|---|---|---|---|---|---|
| Non-Financial Tradelines | TELECOM/ INTERNET/ CABLE | VERIZON | Both Amount & Time | Monthly | $256 | $256 | $263 | $267 | $267 | $251 | $256 | $259 | 20% |
| | | COMCAST CABLE COMM | Only Time | Monthly | $271 | $271 | $271 | $271 | $271 | $271 | $271 | $271 | 21% |
| | | SPRINT WIRELESS | Only Time | Monthly | $1,479 | $274 | $274 | $274 | $274 | $274 | $1,479 | $274 | 37% |
| | | VERIZON | Only Time | Monthly | | | $302 | $433 | | $450 | $302 | $322 | 21% |
| | BILL PAYMENT | Unknown | None | None | | $234 | | | | | $234 | $234 | 6% |
| | AUTO INSURANCE | GEICO | None | None | $264 | $264 | $260 | $260 | $260 | $260 | $146 | $132 | 100% |

VARIABLE DIMENSION & FEATURE ENGINEERING

| | SELECT ATTRIBUTES |
|---|---|
| Cash flow | Avg. daily balance, days cash in hand, min. balance |
| Customer Financials | Income/ Revenue, Debt to income, income concentration, forecasted next month income |
| Recurrence | Stability of income, recurring debt obligations, missed payment, recurring credit |
| Trends | Velocity, volatility, out of pattern, forecasts, seasonality |
| Financial ecosystem (Entity extraction and metadata enrichment) | Institution & vendor name, Income source, Rent, Payroll providers, competitor intelligence, payment to collection agency, insurance claims deposit, luxury restaurant, New age lender |
| Negative Triggers | NSF, overdraft, missed payment, late payment fee |
| Financial Tradelines | Tradeline type, invisible trades, new deposit, payment history, wallet size & share |
| Non-Financial Tradelines | Tradeline type- electricity, water, telecom; new deposit, payment history |
| Index[1] | Risk index, loyalty index |
| Benchmarking | Debt to income percentile, ATM withdrawal percentile |
| Customer profile & life stages | Preferences (Digital savvy, traveler, etc.), life events |
| Debit card spend profile/ pattern | Discretionary spend, healthcare spend |

| Variable Name | Customer 1 | Customer 2 |
|---|---|---|
| AutoLoanIndicator | 1 | 1 |
| BusinessLoanIndicator | 1 | 0 |
| CashInHandDays | 31 | |
| CoefVarCreditCount | 16% | 18% |
| CoefVarDebitCount | 11% | 7% |
| CoefVarRevenue | 17% | 14% |
| CommercialLoyaltyIndex | 1 | |
| CommercialRiskIndex | 3 | 3 |
| CreditCardAmountMonth1 | $161,074 | 5 |
| CreditTransactionsAmountMonth1 | $315,624 | $1,672 |
| DebtRepaymentMonth1 | $47,255 | $131,176 |
| DollarATMCredit | $10,220 | $10,784 |
| DSCR1 | 10% | $0 |
| Electricity/Gas/PowerPaymentCount | 4 | 71% |
| GrossProfitL1byP1 | 65% | 0 |
| InsuranceIndicator | 0 | 269% |
| MaxBalanceMonth1 | $363,893 | 1 |
| MaxOverdraftUtilizedMonth1 | $0 | $14,460 |
| MerchantReversalsAmountMonth1 | $0 | $68,021 |
| MinBalanceMonth1 | $270,212 | $0 |
| MOMTotalDebtRepayment1 | 72.7% | -$17,032 |
| MortgageIndicator | 0 | -12.7% |
| NSFCountTotal | 2 | 1 |
| NSFLastDays | 37 | 46 |
| NSFTotalAmount | $70 | 5 |
| NumBranchCredit | 21 | $1,288 |
| NumDigitalWalletDebitMonth1 | 0 | 0 |
| NumLoanCredits | 9 | 3 |
| NumLoanCreditsMonth1 | 1 | 0 |
| OverdraftLimit | $0 | $20,000 |
| PayrollFrequency | others | others |

ARTIFICIAL INTELLIGENCE BASED TRANSACTIONS CONTEXTUALIZATION PLATFORM

TECHNICAL FIELD

The systems, methods, and computer-readable media disclosed herein relate generally to data analytics and contextualization platforms, such as artificial intelligence based transaction contextualization platforms. Some aspects of the data analytics and contextualization platforms disclosed herein relate to the use of fuzzy logic on unstructured input data to enable contextualization of various input data items that relate to the unstructured input data. Contextualization enables analysis of the input data items by downstream artificial intelligence/machine learning (AI/ML) models.

BACKGROUND

In transactional and data warehousing systems, datasets can include structured (e.g., delimited, addressable) and unstructured data. For structured data, data analytics systems can be used, alone or in conjunction with AI/ML models, to perform operations (e.g., calculations) across records in datasets. Levels of granularity for the calculations can be determined based on various structured data items in the datasets. For example, if several records contain numerical values that correspond to a particular value of a grouping variable, the numerical values can be summarized, across the several records, for the grouping variable. However, unstructured data does not lend itself to use as a grouping variable for data grouping operations. Additionally, feeding unstructured data, without pre-processing, to AI/ML models can adversely impact operating time and predictive value of these models and increase requirements for computing resources, such as memory and disk space. Additionally, some ML models may not natively be able to process unstructured data.

BRIEF DESCRIPTION OF THE DRAWINGS

FIG. 1B shows example inputs of the data analytics and contextualization platform of FIG. 1A in accordance with some implementations of the present technology.

FIGS. 1C-1E show example published outputs (entity behavior maps) generated by the data analytics and contextualization platform of FIG. 1A in accordance with some implementations of the present technology.

FIGS. 2B-2E show example dashboards that visualize aspects of entity behavior maps generated by the data analytics and contextualization platform of FIG. 1A, in accordance with some implementations of the present technology.

Figure 1A:
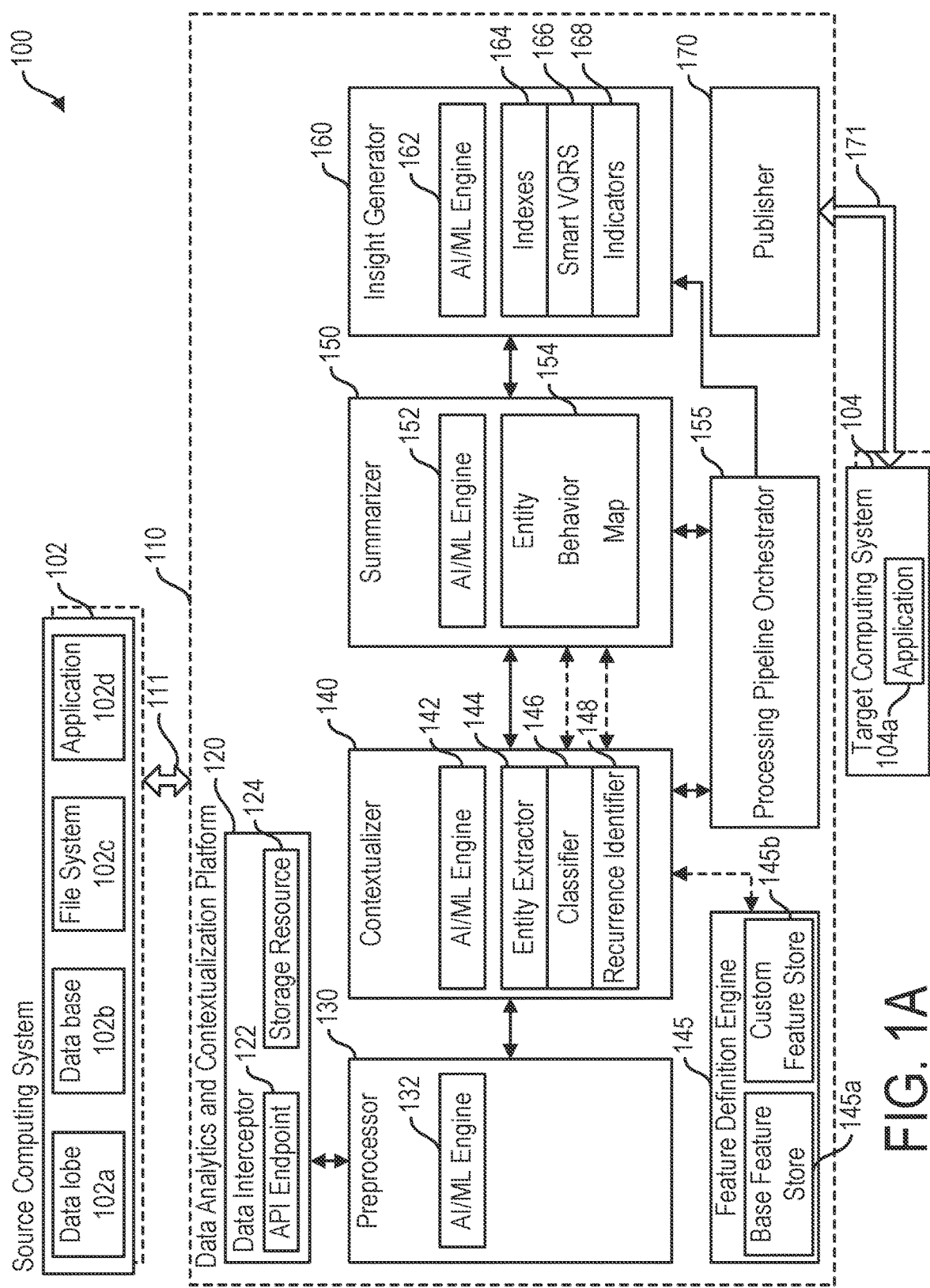
FIG. 1A shows an example computing environment that includes a data analytics and contextualization platform in accordance with some implementations of the present technology.

The drawings have not necessarily been drawn to scale. For example, some components and/or operations may be separated into different blocks or combined into a single block for the purposes of discussion of some of the embodiments of the disclosed system. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents and alternatives falling within the scope of the technology as defined by the appended claims.

DETAILED DESCRIPTION

Despite not being suitable for certain types of machine analytics in its raw form, unstructured data can contain items or pointers to valuable contextual information that help clarify items in the input data. Accordingly, described herein is a data analytics and contextualization platform that enables contextualization of input data items by extracting meaning from unstructured data items that are related to the input data items (e.g., included in the same record, dataset, set of key-value pairs, document, and so forth).

Contextualization of input data enables a host of technical advantages. For example, machine-generated (synthetic) contextual data can be provided, along with context-relevant items extracted from input data, to downstream AI/ML systems in the form of an enriched set that includes features not directly available in raw input data. The enriched features can enable AI/ML models to provide targeted and relevant insights and recommendations. Compared to the size of a raw input dataset, generating enriched features that contain a predetermined set (e.g., 1-100) of contextual items and their corresponding value(s) can reduce the size of the input dataset, which can increase processing speed and model efficiency. Furthermore, performing certain feature generation operations in parallel, as described herein, reduces overall time of data pre-processing and feature generation. Contextual items can help optimize the overall pre-processing time, serving as beginning markers in dynamically constructed dependency trees for parallel processing in summarization operations.

In operation, the platform acquires an input dataset from one or more source computing systems. According to one use case, the input dataset can include transaction data and free-form text items, such as transaction description. The platform can perform various pre-processing operations to cleanse and normalize items in the input dataset. The platform then extracts textual data from one or more unstructured, free-form text items in the input dataset.

Using fuzzy logic, the platform generates a set of contextual items based on the unstructured, free-form text. Contextual items can be thought of as synthetic items not readily available in the input dataset and inferred or generated based on data in the input dataset. For example, the platform can extract from the free-form text or generate items that provide further insight into records in the input dataset and allow the items in the input dataset to be labeled (tagged, associated with, appended to, and so forth) or included in particular features such that the items can be analyzed using AI/ML models. For example, in a transaction-related context, contextual items can include various synthetic properties generated or determined for a particular transaction record, where the properties are not otherwise available in any of the structured data fields associated with a particular transaction record. These synthetic properties can include, for example, various generated classifiers for a transaction, which describe the context for a transaction. For example, the transaction can be an automatic direct deposit payment, which can be determined by using a fuzzy logic algorithm on an item in the transaction description field to reference and extract an item/token that likely corresponds to a record in an employer ontology. In another example, a transaction can be a debt payment transaction as determined, for example, based on transaction periodicity in combination with using a fuzzy logic algorithm to reference and extract an item/token that likely corresponds to a record in a creditor ontology. In another example, the transaction can be determined to be a bill payment transaction, discretionary spending transaction, and so forth. Other synthetic properties of contextual items can include transaction recurrence indicators (amount, time, type, frequency), entity identifiers, merchant identifiers, transaction channel identifiers, entity or transaction location identifiers, and so forth.

Using the outputs of contextualization operations (for example, by referencing labels on the input records), the platform can generate entity behavior maps. The entity behavior maps can show various roll-ups of items in the input dataset based on the determined contextual items. For example, entity behavior maps can provide insight into a particular entity's behavior at the transaction-, tradeline-, or customer/entity level. The platform can perform summarization operations for items on the generated entity behavior maps to generate various aggregations relating to structured items included in the input data and/or contextual items generated based on unstructured input data. The type of aggregations or operations to perform can be determined by the type of the corresponding entity behavior map. For example, certain features, such as a risk index, can be included at the tradeline- or customer-level but not at the transaction level. The platform can further perform higher-level insight generator operations to generate scores, indexes and so forth, particularly at the higher rollup levels, such as tradeline and/or customer. Example types of entity behavior maps (transaction-, tradeline-, or customer/entity level) and their corresponding calculated items are shown with respect to FIGS. 1C, 1D, and 1E.

The platform can publish the output(s) of the above operations for consumption by one or more target computing systems (e.g., in the form of application programming interface (API) messages to one or more target applications). These output items can be included in tabular or key-value pairs, and are also shown with respect to items 220 of FIG. 2B as, for example, classification items 224a-c, amount 226a, time 226b, frequency 226c, entity/merchant 228, channel 230, location 240.

Example Embodiments of a Data Analytics and Contextualization Platform

FIG. 1A shows an example computing environment 100 that includes a data analytics and contextualization platform 110 in accordance with some implementations of the present technology.

As shown, the environment 100 includes one or more of a source computing system 102 and one or more of a target computing system 104. These systems can be communicatively coupled to the data analytics and contextualization platform 110 via a network. Each of the source computing system 102, target computing system 104, and data analytics and contextualization platform 110 can each include various components, including one or more processors, memory modules, transceivers, network interfaces, databases, executable files (in binary form and/or in compiled form), libraries of executables, file structures, and so forth.

In some implementations, any of the source computing system 102, target computing system 104, and data analytics and contextualization platform 110 can be distributed across more than one computing devices. For example, a particular instance of the data analytics and contextualization platform 110 can be deployed as an executable environment available to a subscriber entity (e.g., an entity associated with a particular target computing system 104) in a cloud-based environment, such as, for example, in a virtual private cloud, via a virtual network, in DaaS (data-as a service) computing environment, Saas (software-as-a-service) computing environment, PaaS (platform-as-a-service) computing environment), IaaS (infrastructure-as-a-service computing environment) and/or the like. Accordingly, the executable environment can be deployed as a container, pod of containers, cluster of containers, or a dedicated computing grid in a cloud-based environment, which provide varying levels of process and data isolation to meet various levels of data privacy and regulatory standards. At a minimum, the cloud-based implementation infrastructure described herein allows (at the container level) for isolating API calls and data workflows, which secures and isolates data streams and data stores of a particular entity (e.g., an entity associated with a particular source computing system 102 or target computing system 104).

An example source computing system 102 can be or include any suitable computing system that provides transactional or warehoused (aggregated, dimensioned) data, such as a financial institution computing system, an insurance claims management system, an underwriting system and so forth. A target computing system 104 can be or include a computing system associated with a consumer entity for the output data of the data analytics and contextualization platform 110, which may be the same or different entity relative to the source computing system 102. For example, a particular source computing system 102, connected to a particular instance of the data analytics and contextualization platform 110, can be operated by a particular financial institution and include transaction data. The financial institution can also be a consumer of the outputs of the particular instance of the data analytics and contextualization platform 110 via a particular target computing system 104. In another example, another particular source computing system 102, connected to the particular instance of the data analytics and contextualization platform 110, can include a computing system of a financial transaction processor or aggregator (e.g., and entity that provides data via Open Banking or a similar communications infrastructure, where the data is contributed by ecosystem participants, such as in a consortium fashion), and the financial institution can consume the outputs of the data analytics and contextualization platform 110 via the particular target computing system 104, wherein the outputs are generated using aggregated financial transaction data from multiple financial institutions, using transaction data for a customer of the financial institution, and so forth.

As shown, the data analytics and contextualization platform 110 includes various engines, some of which can be omitted or combined according to various implementations. As used herein, the term "engine" refers to one or more sets of computer-executable instructions, in compiled or executable form, that are stored on non-transitory computer-readable media and can be executed by one or more processors to perform software- and/or hardware-based computer operations. The computer-executable instructions can be special-purpose computer-executable instructions to perform a specific set of operations as defined by parametrized functions, specific configuration settings, special-purpose code, and/or the like. The engines can generate and/or receive various electronic messages (e.g., via channels 111, 121). Whenever a particular message is referred to in singular form, one of skill will appreciate that more than one electronic messages can be used to carry out the described operations. For example, a particular dataset, record, or item therein can be broken down into multiple messages. Furthermore, a particular system or module can generate or receive multiple items (e.g., datasets, records, and/or items) in a particular message.

As shown according to an example implementation, the various engines of data analytics and contextualization platform 110 can include a data interceptor 120, a preprocessor 130, a contextualizer 140, a feature definition engine 145, a summarizer 150, a processing pipeline orchestrator 155, an insight generator 160, and a publisher 170.

The data interceptor 120 executes operations to acquire (receive, query, and so forth) input datasets from one or more source computing systems 102. In some implementations, the input data can be acquired via queries from various data sources associated with source computing systems 102, such as one or more of a data lake 102a and/or a database 102b. For example, a particular input dataset can originate from a data warehousing system, such as a data lake 102a and/or from a data warehousing or transactional database 102b. In some implementations, the input data can be received from a particular application 102d, in the form of an API message, at the API endpoint 122 of the data interceptor 120. The API endpoint 122 can be a specific location within an API that accepts requests and sends back responses. In some implementations, the input data can be received, at the storage resource 124 of the data interceptor 120, from a particular file system 102c and/or from a particular application 102d (e.g., via an FTP process or another similar process). The storage resource 124 (e.g., an Amazon Simple Storage Service (S3) bucket or similar) can be a cloud storage resource that receives and stores various files in an electronic data interchange ecosystem. The API endpoint 122 and/or the storage resource 124 can be an addressable location on a physical or virtual server of the platform 110. The addressable location can be identified by a URL, and IP address, a port number, or a combination thereof.

FIG. 1B shows example inputs 192 of the data analytics and contextualization platform of FIG. 1A. A particular input dataset can be included in an API message and can include one or more transaction records (192a, 192b, 192c). The transaction records can include various items, such as transaction identifiers, customer identifiers, account identifiers, transaction types (e.g., credit, debit), descriptions, amounts, date/time stamps, account available balance, and so forth. These items are also shown with respect to items 220 of FIG. 2B as, for example, items in example transactions 221 (e.g., description 222a, amount 222b, date 222c). One of skill will appreciate that the illustrated inputs are merely examples, and the data analytics and contextualization platform 110 can be utilized in other contexts, such as insurance claim analytics, underwriting, and so forth.

The preprocessor 130 executes pre-processing operations to optimize and/or normalize items in the input dataset. The pre-processing operations can include renaming items in the received dataset in accordance with a particular naming convention or ontology (e.g., from a base feature store 145a, custom feature store 145b, and so forth), checking and resolving unexpected values, and so forth. The pre-processing operations can further include performing quantization operations (e.g., data type conversion, such as from a floating point value to an integer value, aimed to reduce the size of input data and improve model efficiency), replacing null values with default values, filling in missing data using regression-based machine learning models, concatenating and/or truncating string values, segmenting long text items into a plurality of strings of predetermined length, and so forth. To that end, the preprocessor 130 can include an AI/ML engine 132 structured to perform AI/ML based preprocessing operations, such as filling in missing data using regression algorithms, segmenting (tokenizing) text items, and so forth.

The contextualizer 140 executes operations to enable contextualization of input data items and make input data items suitable for analysis via artificial intelligence/machine learning (AI/ML) downstream of the contextualizer 140 (e.g., the AI/ML engines 144, 146, 148, 152, and/or 162). To that end, the AI/ML engine 142 can execute fuzzy logic and/or elastic search operations on an item in the input dataset (e.g., a free-form text field, such as transaction description) and/or on one or more tokens extracted therefrom, as described, for example, relative to FIGS. 2A and 3B. The contextualization operations of the AI/ML engine 142 generate one or more contextual items. Contextual items enable various transaction insights and can serve as a starting point for generating, by the summarizer 150, of various entity behavior maps. In a transaction use case, contextual items can include, for example, classification items (income/revenue transaction class descriptors, debt payment transaction class descriptors, bill payment transaction class descriptors, spend transaction class descriptors, and/or fee transaction class descriptors), recurrence items (amount, time, type, frequency), entity/merchant, channel, location, and so forth.

In some implementations, the contextualizer 140 can perform various additional operations using the input dataset and/or generated contextual items. For example, the entity extractor 144 of the contextualizer 140 can determine various entities based on the input dataset. The entities can correspond to various levels at which entity behavior maps can be generated, such as transaction, tradeline, and/or customer. Some entities can be determined by parsing items from the input dataset. With reference to an example transaction record 192a of FIG. 1B, transaction-level data can be identified in the input dataset by "Transaction_ID" or a similar item that includes a transaction identifier. Customer-level data can be identified in the input dataset by "Customer_ID", "Account_ID" or a similar item that includes a customer unit or entity identifier. Other entities, such as tradelines, can be determined using the generated contextual items, as described according to an example of FIG. 2A. As another example, the classifier 146 of the contextualizer 140 can execute a classification machine learning model to analyze the generated contextual items, such as merchant identifiers, dates, debit or credit transaction type, channels, locations, to determine how the contextual items relate to various transaction class descriptors. As yet another example, the recurrence identifier 148 of the contextualizer 140 can generate a dataset that includes a subset of transactions that correspond to a particular contextual item and execute operations to infer recurrence patters by determining date differences (e.g., in days, months, and so forth) between any two transactions in the set, where the transactions are ordered to occur one after another without intervening transactions of similar type.

The summarizer 150 executes operations to generate various statistical summaries (e.g., sums, averages, lowest values, highest values, and so forth) for corresponding to particular contextual items and at particular roll-up levels. The contextual items can be thought of as columns or items in a resulting output dataset. The particular roll-up levels can be thought of as a particular type of output dataset/entity behavior map (e.g., transaction-level, tradeline-level, customer-level), which can be included in metadata associated with an outbound API message for the output dataset. A particular roll-up level, therefore, can correspond a particular type of entity behavior map 154 on which the API message is based. To that end, the summarizer 150 can generate one or more entity behavior maps 154 and then execute (e.g., at the tradeline and/or customer level) various summarization operations to populate items in the entity behavior maps 154. The particular summarization operations can be selected based on the type of an entity behavior map such that the corresponding executables or AI/ML models are conditionally activated based on the determined type of entity behavior map. For example, certain variables, such as customer credit risk, can be estimated at the customer level rather than at the transaction level and therefore AI/ML models that make these determinations would not be activated for transaction data. This approach, advantageously, can improve performance of the activated AI/ML models by providing to the models, as appropriate, feature maps that include data aggregations rather than, or in addition to, raw data. For example for certain items, raw data (e.g., amounts) may be less meaningful than scaled data (e.g., percentage of on-time payments across accounts).

Figure 1D:
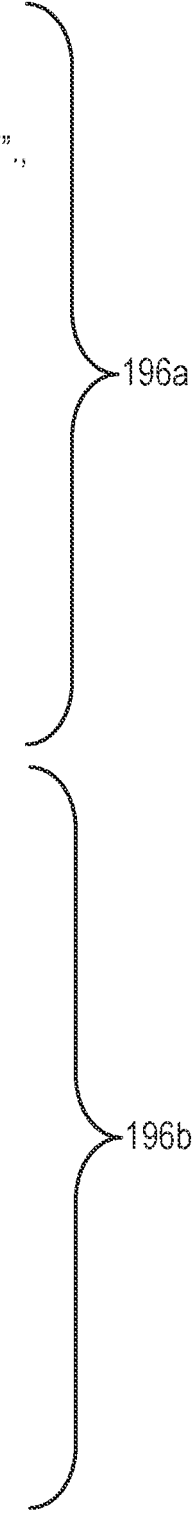

FIGS. 1C-1E show example published outputs (corresponding to entity behavior maps 154) generated by the summarizer 150.

A transaction-level entity behavior map 154 of FIG. 1C includes example items 194, which describe how a particular entity (commercial or consumer) functions at a transactional level of granularity. The items can include values parsed from input data (e.g., transaction id, description, amount, date) and/or synthetic contextual items generated or determined based on input data (e.g., customer id, account id, transaction type, transaction category, vendor name, institution name, recurrence type, recurrence frequency, auto-pay yes/no indicator, channel, city).

A tradeline-level entity behavior map 154 of FIG. 1D includes example items 196a and/or 196b, which describe how a particular entity (commercial or consumer) functions at a tradeline level of granularity. The items can include values parsed from input data and/or synthetic contextual items generated or determined based on input data (e.g., customer id, tradeline id, tradeline type, tradeline subtype, institution (e.g., lender, counterparty, merchant) name, institution type, recurrence frequency, periodicity information, and so forth). The items can include various aggregations (e.g., examples of tradeline analytics) generated by the summarizer 150, such as periodic payment amounts (payment ticket size), actual payment amounts, last payment date/time, last payment amount, and/or share of payment. Additional examples of tradeline-level data (272, 274) are shown with respect to FIG. 2D. For example, a transaction or group of transactions in a particular tradeline (272, 274) can be further associated with a tradeline subtype 276, contextual item 278 (e.g., institution, merchant), recurrence type 280, recurrence frequency 282, payment patterns 284, determined last payment amount 286, determined average payment transaction size 288, and determined share of total payment 270.

A customer-level entity behavior map 154 of FIG. 1E includes example items 198, which describe how a particular entity (commercial or consumer) functions overall. The items can include values parsed from input data and/or synthetic contextual items generated or determined based on input data (e.g., customer id, auto loan y/n, business loan y/n, and/or payment frequency). The items can include various aggregations generated by the summarizer 150, such as cash-in-hand days, credit count, debit count, debt repayment amounts, non-sufficient funds statistics, overdraft limit, and so forth. The items can include various scores/ indexes 164, smart variables 166, and/or indicators 168 generated by the insight generator 160, such as commercial loyalty index, commercial risk index, and so forth.

Referring to elements of FIG. 1A, the processing pipeline orchestrator 155 executes operations to synchronize operations of the contextualizer 140, summarizer 150, and/or insight generator 162. For example, the processing pipeline orchestrator 155 can generate a dependency tree for the various operations performed by these engines and cause the engines to execute their respective operations in accordance with the dependency tree in order to minimize the overall execution time of the pipeline (e.g., from data ingestion to execution of publisher 170 operations).

In an example implementation, the processing pipeline orchestrator 155 can order certain operations and/or execute certain operations in parallel. Various contextual items can serve as starting point markers (triggers) in dynamically generated dependency trees. For example, once a particular contextual item is generated, the processing pipeline orchestrator 155 can cause the summarizer 150 to generate and/or update a particular entity behavior map 154 to include the contextual item and generate the corresponding summary statistics. In another example, various operations of the entity extractor 144, classifier 146, and recurrence identifier 148 can be executed in parallel such that a particular entity behavior map 154 is generated and/or updated to include additional columns as the items become available in the form of outputs of the corresponding entity extractor 144, classifier 146, and recurrence identifier 148. For example, if the operations of classifier 146 complete first, the entity behavior map 154 can be first updated to include a first column for a particular generated transaction class descriptor. If the operations of recurrence identifier complete next, the entity behavior map 154 can be next updated to include second column(s) for the generated recurrence type, recurrence frequency, autopay y/n, periodicity, and so forth.

The contextualizer 140, summarizer 150, and/or insight generator 160 can work in conjunction with the feature definition engine 145, which can include a base feature store 145*a* and/or a custom feature store 145*b*. The feature definition engine 145 can execute operations to identify, using the input dataset and/or contextual items, a primary base variable, which can be a particular contextual item (e.g., item 298 of FIG. 2E) or a larger category associated therewith (e.g., dimension 256 of FIG. 2E). For example, a particular primary base variable can correspond to a determined debt payment transaction class descriptor, such as "Debt-Auto Loan", which can be a contextual item generated based on a transaction description using fuzzy logic. The feature definition engine 145 can execute operations to relate the primary base variable to various categories (e.g., consumer, commercial, both), various risk levels (e.g., low, medium, high), data transformation operations (e.g., function calls that perform a particular aggregation operation (min, max, average) or calculation (sum, ratio) for a corresponding amount), and so forth. Accordingly the feature definition engine 145 can accept, as an input, a particular contextual item and a corresponding amount and return a calculation or aggregation (or perform another suitable AI/ML operation as described herein) by performing a function call selected based on the particular contextual item. For example, once a particular transaction is labeled with a particular contextual item, the contextual item for the transaction can be used to determine how to transform input data from the transaction record (e.g., amount) for inclusion in a particular feature.

In some implementations, the feature definition engine 145 provides output definitions (feature definition criteria) for higher-level operations of the insight generator 160. Example output definitions 296 (shown in FIG. 2E) can be based on various items from entity behavior maps 154 and can be used to further augment the entity behavior maps 154. In an example implementation, an AI/ML engine 162 of the insight generator 160 can accept as inputs various attribute items 298, which can be structured as items (columns) in a particular entity behavior map 154. The AI/ML engine 162 can use, for example, a neural network to assign weights to various input items and utilize the values the input items in accordance with the weights to generate the resulting output definitions. As an example, a particular dimension in the output can be conceptualized as cash flow, and its contributing attributes can include an average daily balance, minimum cash on hand, minimum account balance, and the like. Various customers/entities can be compared at 299 according to the resulting taxonomy.

The publisher 170 executes operations to generate one or more output datasets (e.g., the outputs of FIGS. 1C-1E), which can be received or otherwise accessed by an application 104*a* of a target computing system 104. In some implementations, the output datasets are included in API messages transmitted to the target computing system 104.

Figure 2A:
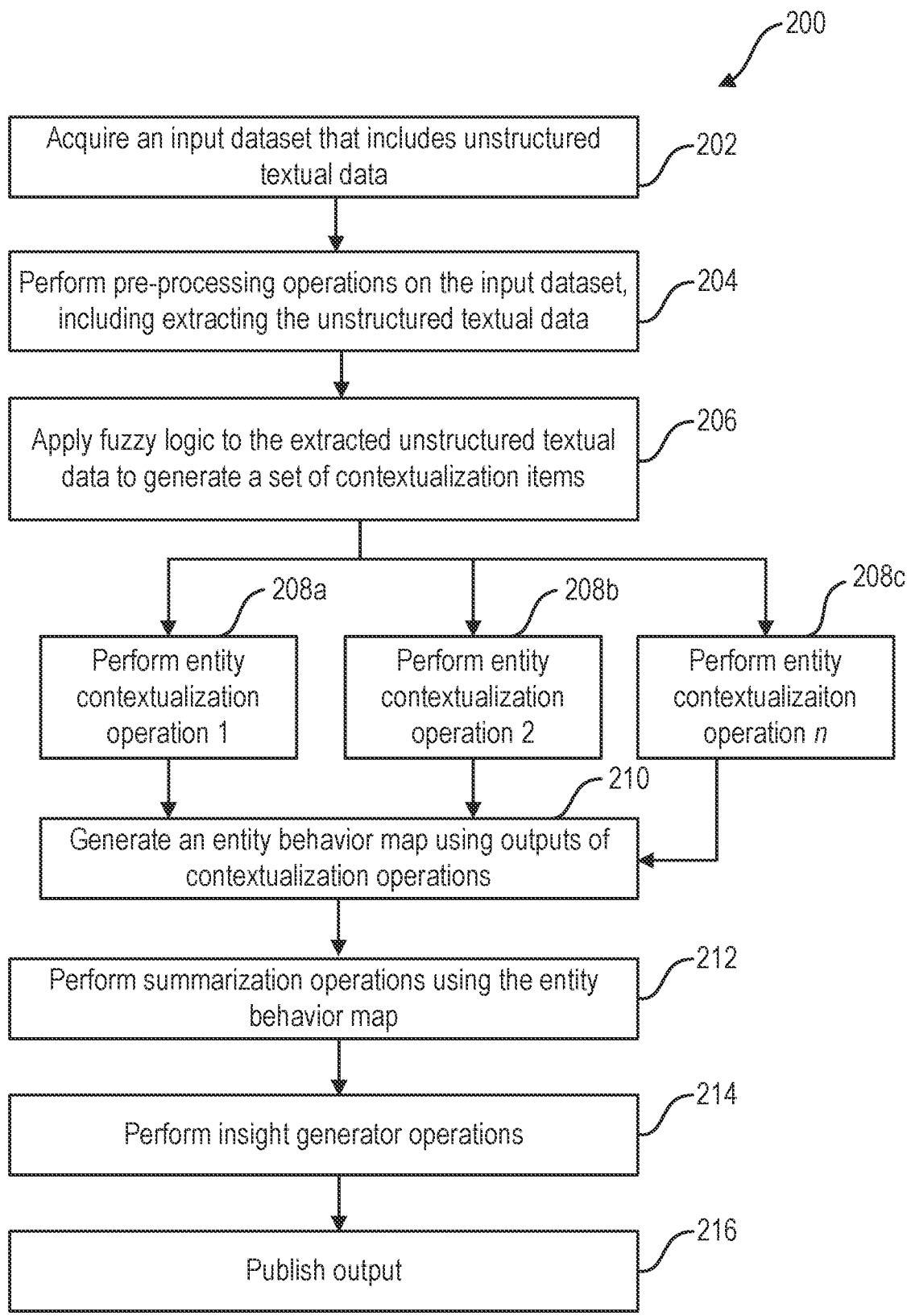
FIG. 2A is a flowchart depicting an example method of operation of the data analytics and contextualization platform of FIG. 1A, in accordance with some implementations of the present technology.

Example Methods of Operation of the Data Analytics and Contextualization Platform FIG. 2A is a flowchart depicting an example method 200 of operation of the data analytics and contextualization platform 110 of FIG. 1A, in accordance with some implementations of the present technology. FIGS. 2B-2E show example dashboards that visualize aspects of entity behavior maps 154 generated by the data analytics and contextualization platform 110 of FIG. 1A, in accordance with some implementations of the present technology.

As a general overview, the method 200 includes acquiring an input dataset and performing pre-processing operations on the input dataset. The method 200 further includes extracting textual data from the input dataset and using fuzzy logic to generate a set of contextual items, such as classification items, recurrence items (amount, time, type, frequency), entity/merchant, channel, location, and so forth. The method 200 further includes performing various entity contextualization operations and generating one or more entity behavior maps using the outputs of contextualization operations. The method 200 further includes performing summarization operations for items on the generated entity behavior map(s), performing insight generator operations, and publishing the output(s) of these operations. These items are discussed in accordance to example implementations, and one of skill will appreciate that various operations can be combined and/or omitted.

At operations 202, the data interceptor 120 of the data analytics and contextualization platform 110 of FIG. 1A acquires an input dataset. In an example implementation relating to transaction analytics, the input dataset can include various raw transaction data elements, such as the elements included in electronic messages generated according to various financial data interchange standards (Open Banking, ACH, and so forth). The raw transaction data elements can include any or all of the input items described in reference to FIG. 1B, such as transaction identifiers, customer identifiers, account identifiers, transaction types, transaction description, transaction amounts, transaction dates, account available balance, and so forth. The dataset can be in a suitable structured format, such as Excel, json, or another tabular format. In some implementations, the input dataset is acquired via an API endpoint 122. In some implementations, the input dataset is acquired via a storage resource 124.

At operations 204, the preprocessor 130 of the data analytics and contextualization platform 110 of FIG. 1A performs pre-processing operations on the input dataset. The pre-processing operations can include renaming items in the received dataset in accordance to a particular naming convention or ontology, checking and resolving unexpected values, and so forth. The pre-processing operations can further include performing quantization operations (e.g., data type conversion, such as from a floating point value to an integer value, aimed to reduce the size of input data and improve model efficiency), replacing null values with default values, filling in missing data using regression-based machine learning models, concatenating and/or truncating string values, segmenting long text items into a plurality of strings of predetermined length, and so forth.

At operations 206, the contextualizer 140 of the data analytics and contextualization platform 110 of FIG. 1A generates a set of one or more contextual items using data from the input dataset. Generating the contextual items can include executing fuzzy logic operations with respect to one or more tokens from the input dataset, as described in reference to FIG. 3B. Using fuzzy logic, the data analytics and contextualization platform 110 is enabled to generate contextual items (e.g., merchant, periodicity) and use these items to contextualize various other items (e.g., amount) in the input dataset based on unstructured data from the input dataset. For example, contextual items can include classification items, recurrence/periodicity items (amount, time, type, frequency), entity/merchant, channel, location, and so forth. The generated contextual items are synthetic values that can make items in the input dataset suitable for analysis by downstream AI/ML engines (e.g., 144, 146, 148, 152, 162) to generate various calculations, aggregations, summaries, predictions, and so forth.

In some implementations, the input dataset can contain a free-form text field, such as description 252 shown in reference to FIG. 2C. The preprocessor 130 and/or contextualizer 140 can parse the free-form text field into one or more tokens. The tokens can correspond to units of information, such as sentences, words, strings of predetermined length such as a standard record length, and so forth. More generally, tokens can be extracted from or generated, for example, as described above and/or in U.S. patent application Ser. No. 17/988,684, which is incorporated herein by reference in its entirety and for all purposes. In some implementations, tokens correspond to segments of the description field, where the segments have predetermined start and end positions. In some implementations, tokens are identified as textual content that follows a particular label (e.g., "DES", "PMT ID", "ID") and delimiter (e.g., ":", " ", ","). In some implementations, the entirety of the free-form text field constitutes a token.

In some implementations, the tokens are further labeled with metadata that describes various features determined by automatically processing the tokens. The features can describe various determined properties of the tokens, such as item length, item location (within a larger free-form text), presence of a particular character sequence, and so forth. The metadata makes the tokens suitable for processing and classification using fuzzy logic, such as by the fuzzifier component of an example fuzzy logic engine described in relation to FIG. 3B.

At operations 208a, 208b, and/or 208c, various entity contextualization operations can be performed by engines of the contextualizer 140 using the generated contextual items and/or items extracted from the input dataset.

For example, the contextualizer 140 can, at 208a, extract items from the input dataset using the entity extractor 144. The entities can correspond to various levels at which entity behavior maps can be generated, such as transaction, tradeline, and/or customer. With reference to an example transaction record 192a of FIG. 1B, transaction-level data can be identified in the input dataset by "Transaction_ID" or a similar item that includes a transaction identifier. Customer-level data can be identified in the input dataset by "Customer_ID", "Account_ID" or a similar item that includes a customer unit or entity identifier. Tradeline-level data is not ordinarily available in raw input datasets and can be determined using a generated contextual item or a combination thereof. For example, referring to FIG. 2D, if a particular contextual item 278 is determined to denote a particular financial institution, the entity extractor 144 can determine the corresponding tradeline subtype 726 (auto loan payment, credit card payment, or business loan payment), and a type of the tradeline for the financial institution (financial tradeline 272). If a particular contextual item 278 is determined to denote a particular merchant, the entity extractor 144 can determine the corresponding tradeline subtype 726 (telecom/internet payment, bill payment, auto insurance) and a type of the tradeline for the merchant (non-financial tradeline 274).

Figure 2B:
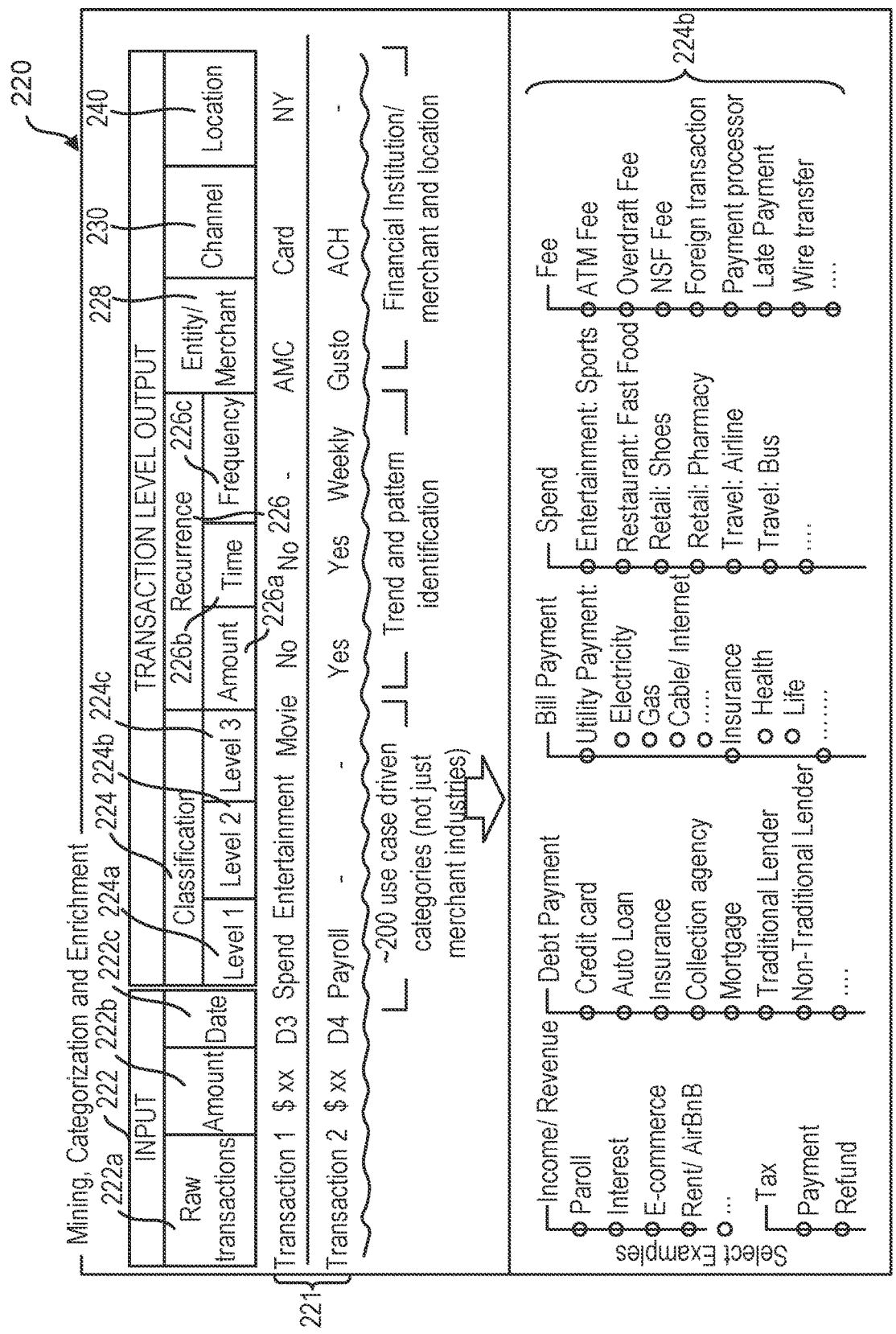
Figure 3A:
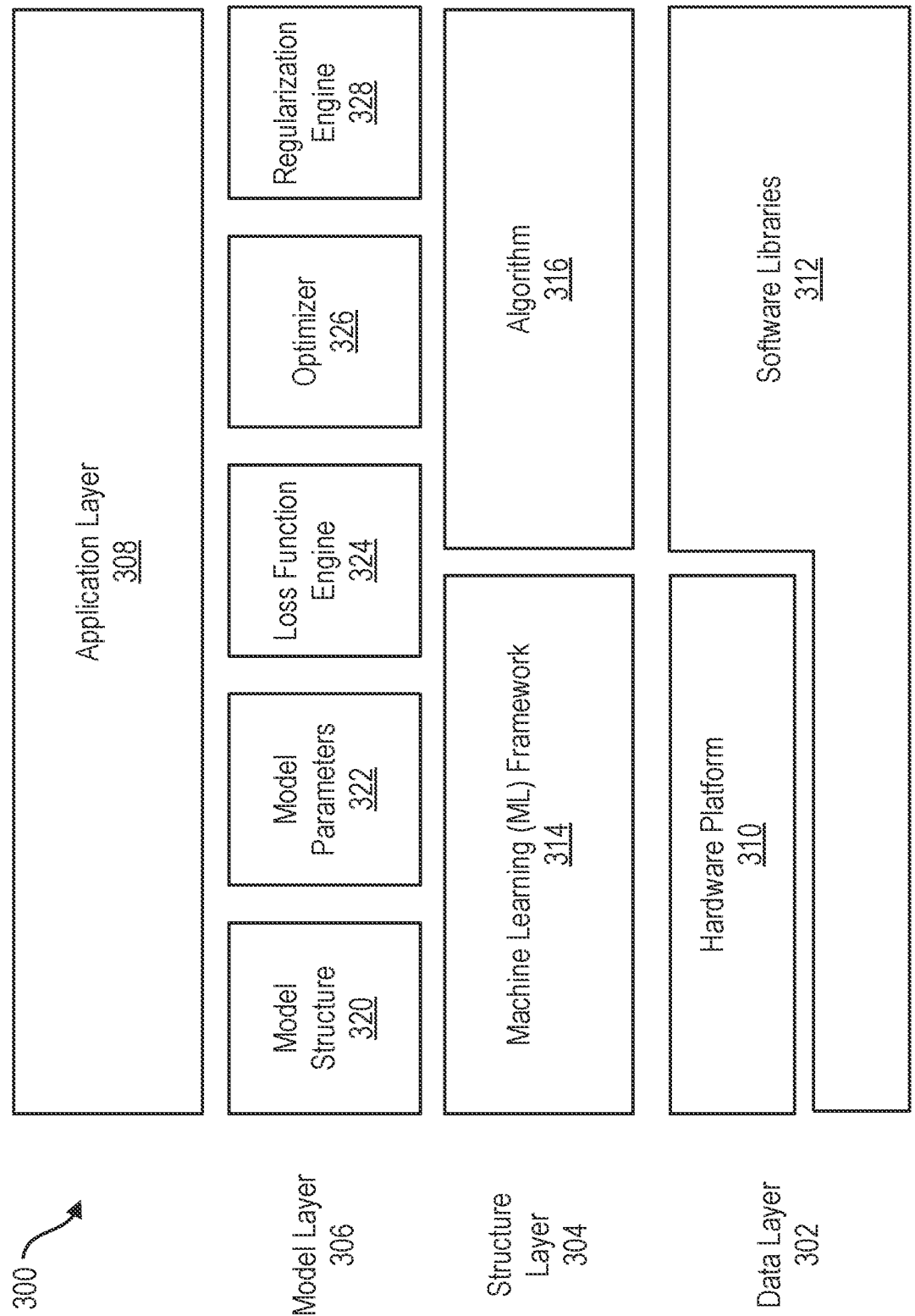
FIG. 3A illustrates a layered architecture of an artificial intelligence (AI) system that can implement the machine learning models of the data analytics and contextualization platform of FIG. 1A, in accordance with some implementations of the present technology.

As another example, the contextualizer 140 can, at 208b, perform classification operations using the classifier 146 (for example, as described in reference to FIG. 3A). For example, a classification model can analyze the generated contextual items, such as merchant identifiers, dates, debit or credit transaction type, channels, locations, to determine how the contextual items relate to various transaction class descriptors, such as classifications 224 discussed in relation to FIG. 2B. In some implementations, the classifier 146 can execute operations of the feature definition engine 145, which can reference a base feature store 145a, a custom feature store 145b, and various additional ontologies (e.g., based on additional data received from entities such as credit scoring bureaus, asset databases, property databases) to cross-reference a particular contextual item to a particular transaction class descriptor. Example transaction class descriptors can include items such as income/revenue transaction class descriptors, debt payment transaction class descriptors, bill payment transaction class descriptors, spend transaction class descriptors, and/or fee transaction class descriptors.

As another example, the contextualizer 140 can, at 208n, perform item recurrence identification operations using the recurrence identifier 148. For example, a set of similar transactions can be identified using fuzzy logic, where the transactions are determined to have similar values for a particular contextual item. Transactions that have similar values for a particular contextual item can be said to belong to the same category (e.g., same merchant, same transaction type—debit or credit, same channel, same location, same tradeline, same transaction class descriptor, and so forth). Then, the recurrence identifier 148 can execute operations to infer recurrence patters by determining date differences (e.g., in days, months, and so forth) between any two transactions in the set, where the transactions are ordered to occur one after another without intervening transactions of similar type. Accordingly, the recurrence identifier 148 can determine various recurrence related properties, such as recurrence type (1—monthly, 2—weekly, 3—biweekly, 4—daily), recurrence frequency/periodicity (biweekly, monthly, and so forth), autopay y/n, and so forth.

In an example, the recurrence identifier 148 can parse the input data and generate contextual items to obtain a dataset with the following columns: debit/credit, transaction amount, transaction date, description. The transactions in the dataset can be binned (grouped) according, for example, to the following: description, description counter, and amount counter. The description counter and transaction counter can, upon validation, be sued to categorize the data into example categories, such as D1A1 (description 1, amount 1), D1A2 (description 1, amount 2), or D1A3 (description 1, amount 3). Then, transactions in each bin can be tagged with a particular recurrence frequency inferred based on the binning range (e.g., the determined periodicity of transactions, such as, for example, if a date difference between two successive transactions is 14 days, it can be inferred that the periodicity is "biweekly". In some implementations, the periodicity calculation can adjust for weekends.

The resulting dataset can in the following example format:

| Description | RecurrenceType | RecurrenceFrequency |
|---|---|---|
| ORIG CO NAME: QPAY INC ORIG ID: 14 . . . | 1 | Bi Weekly |
| ORIG CO NAME: MERCHANT SERVICE ORIG ID: 18 . . . | 1 | Monthly |
| ORIG CO NAME: MERCHANT SERVICE ORIG ID: 18 . . . | 2 | Monthly |
| USAA FUNDS TRANSFER CR | 3 | Bi Weekly |

In some implementations, the next set of operations parses the Description column using fuzzy logic or another suitable technique, such as elastic search, rule-based AI techniques, and so forth, to identify a grouping value for the transaction, such as merchant, tradeline, transaction class descriptor, location, and so forth. In some implementations, the grouping value for the transaction is identified before the recurrence type and recurrence frequency are determined.

At operations 210, the summarizer 150 of the data analytics and contextualization platform 110 of FIG. 1A generates one or more entity behavior maps 154. As described in relation to FIG. 1A, the generated entity behavior maps can be transaction-level, tradeline-level, and/or customer-level. Referring to FIG. 1E as an example (a customer-level entity behavior map), generating a particular entity behavior map at this stage can include generating a tabular or key-value pair dataset that includes column labels (keys). The column labels to be included can be provided by the feature definition engine based on settings for a particular customer (e.g., target application 104a). Example column labels (keys), as shown, can include a customer identifier, auto loan indicator y/n, and so forth. At this stage the summarizer 150 can populate (add values for) certain items. For example, items that have been parsed from the input data (e.g., customer_id) can be populated. Items that have been determined or generated by contextualization operations (e.g., transaction class description, such as "electricity/gas/power payment count") can also be populated.

At operations 212, the summarizer 150 of the data analytics and contextualization platform 110 of FIG. 1A performs summarization operations. As part of performing summarization operations, a particular entity behavior map can be populated with the corresponding values. Continuing the example, the count of utility payments can be set to a particular value (as shown, 4) by determining the number of corresponding tradelines for the customer identified by the customer_id. More generally, the calculations generated by the summarizer 150 can include any appropriate statistical operations or aggregations, such as cash-in-hand days, credit count, debit count, debt repayment amounts, non-sufficient funds statistics, overdraft limit, and so forth.

At operations 214, the insight generator 160 of the of the data analytics and contextualization platform 110 of FIG. 1A performs higher-level insight generation operations. The items of the entity behavior map that are populated at this stage can include various scores/indexes 164, smart variables 166, and/or indicators 168 generated by the insight generator 160, such as commercial loyalty index, commercial risk index, and so forth. The insight generator can perform various AI/ML modeling operations to populate the maps with these items. For example, recurrence analytics can include executing AI/ML operations to identify payment periodicity and determine whether payments have been missed (e.g., not made according to the identified periodicity). Item tradeline analytics and/or descriptor class analytics can include executing AI/ML operations to compute scores or indexes, such as commercial risk indexes (e.g., computed based on factors such as transaction amount, account balance, number of missed payments). Item location analytics can include executing AI/ML operations to generate predictions regarding customer behavior based on determined locations of past transactions. Entity income analytics can include executing AI/ML operations to determine a share or patterns (e.g., to generate projections based on periodicity) of recurring income or revenue for a particular group of transactions (e.g., for transactions associated with a particular category that maps to an extracted token, such as retail sales). Entity employer analytics can include executing AI/ML operations to generate risk scores associated with an employer characteristic. An employer can be determined based on an extracted token. Additional data sources can be referenced to determine company size, years in business, solvency scores, historical stock prices and so forth. Based on this data, the platform can generate predictions, such as employee stability scores, income stability scores, and so forth.

At operations 216, the publisher 170 of the data analytics and contextualization platform 110 of FIG. 1A publishes one or more output datasets, which can be received or otherwise accessed by an application 104a of a target computing system 104. The output dataset(s) can include the elements sufficient for the receiving system to process and/or visualize the corresponding entity behavior map as well as its corresponding indexes, smart variables, indicators, and so forth. For example, the output dataset(s) can be structured to include transaction-level items (as in FIG. 1C), tradeline-level items (as in FIG. 1D), or customer-level items (as in FIG. 1E). The various items can include the corresponding outputs of summarization operations 212 and/or insight generator operations 214. These outputs can include, for example, calculated, determined, or predicted indexes 164, smart variables 166, and/or indicators 168, such as the items shown in FIGS. 1C-1E.

In some implementations, the publisher 170 can generate an API message that includes a particular output dataset. The API message can further include metadata. In some implementations, the metadata can include an API type, which can specify whether the API message should be transmitted to the target computing system 104 in real time or included in a batch of API messages for periodic (e.g., hourly, daily) transmission. In some implementations, the metadata can include an output type, which can specify a particular type of entity behavior map on which the API message is based, such as transaction-level, tradeline-level, and/or customer-level. In some implementations, the metadata can include a target application identifier for the application 104a. The application identifier can include routing information in the form of any of a hyperlink uniquely generated for the target application, an IP address, a port number, or any combination thereof. In some implementations, the metadata can include a set of use case identifiers, which can include reference(s) to particular dimension shown in FIG. 2E. Accordingly, various output datasets can be customized (e.g., for particular target applications 104a) to include specific particular dimension data, which optimizes the size of output datasets transmitted via a network.

Figure 3B:
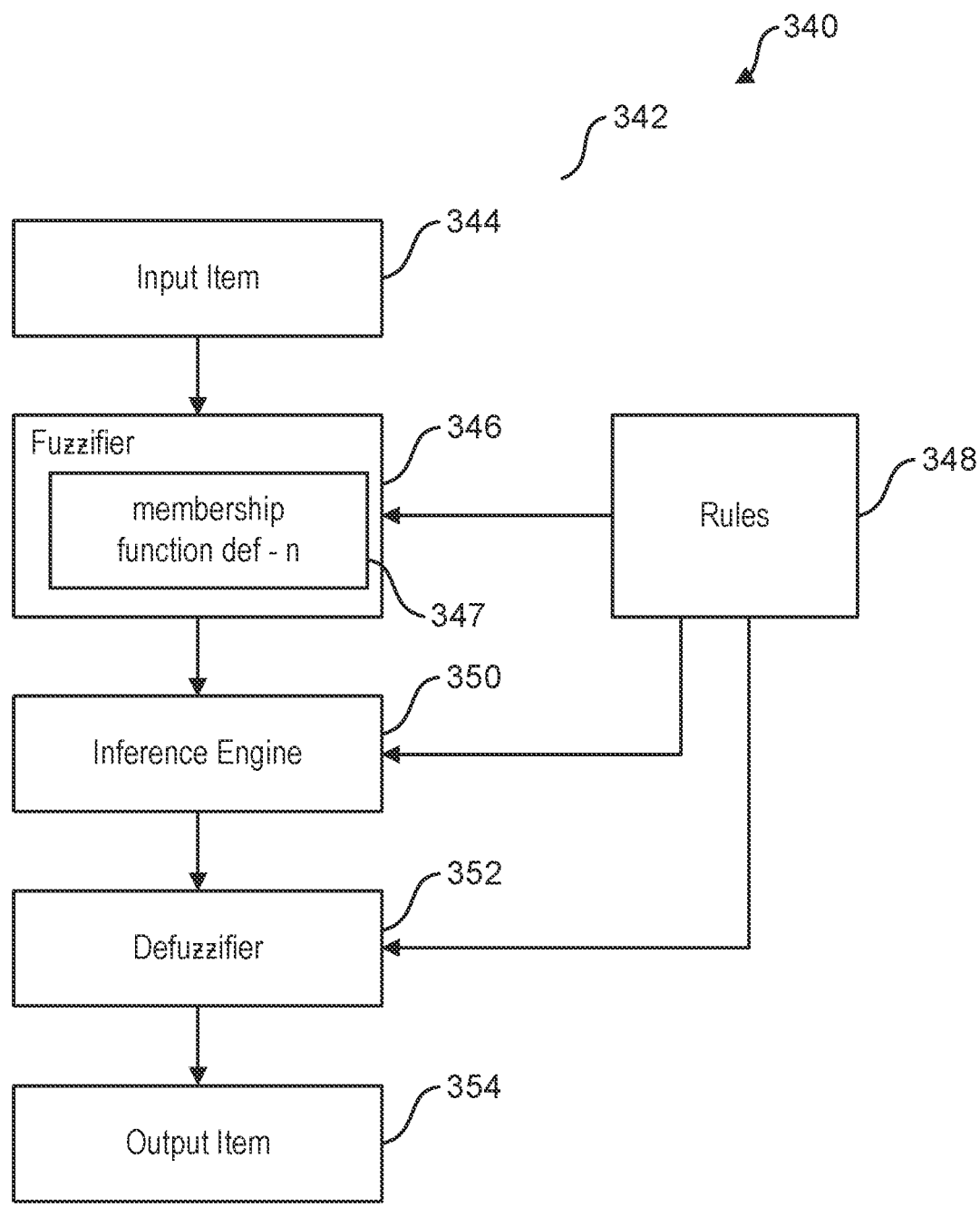
FIG. 3B illustrates an example fuzzy logic engine of the data analytics and contextualization platform of FIG. 1A, in accordance with some implementations of the present technology.

Example Embodiments of the AI/ML Engines of the Data Analytics and Contextualization Platform FIG. 3A illustrates a layered architecture of an artificial intelligence (AI) system 300 that can implement the machine learning models of the data analytics and contextualization platform 110 of FIG. 1A, in accordance with some implementations of the present technology. FIG. 3B illustrates an example fuzzy logic engine of the data analytics and contextualization platform 110 of FIG. 1A, in accordance with some implementations of the present technology. For example, the AI/ML engine(s) 132, 142, 144, 146, 148, 152, and/or 162 can include some or all elements described in relation to FIGS. 3A and/or 3B. Additionally, elements of FIG. 3B can be implemented according to the infrastructure described in relation to FIG. 3A.

As shown according to FIG. 3A, the AI system 300 can include a set of layers, which conceptually organize elements within an example network topology for the AI system's architecture to implement a particular AI model. Generally, an AI model is a computer-executable program implemented by the AI system 300 that analyzes data to make predictions. In some implementations, the AI model can include a fuzzy logic engine 340 of FIG. 3B or another type of logic. In some implementations, the AI model can include various other models, such as neural networks trained to identify entities in pre-processed input data, classify entities in pre-processed input data, identify recurrence and other patterns in pre-processed input data, generate indexes, generate smart variables, generate indicators, and so forth.

In the AI model, information can pass through each layer of the AI system 300 to generate outputs for the AI model. The layers can include a data layer 302, a structure layer 304, a model layer 306, and an application layer 308. The algorithm 316 of the structure layer 304 and the model structure 320 and model parameters 322 of the model layer 306 together form an example AI model. The optimizer 326, loss function engine 324, and regularization engine 328 work to refine and optimize the AI model, and the data layer 302 provides resources and support for application of the AI model by the application layer 308.

The data layer 302 acts as the foundation of the AI system 300 by preparing data for the AI model. As shown, the data layer 302 can include two sub-layers: a hardware platform 310 and one or more software libraries 312. The hardware platform 310 can be designed to perform operations for the AI model and can include computing resources for storage, memory, logic and networking, such as the resources described in relation to FIGS. 4 and 5. The hardware platform 310 can process amounts of data using one or more servers. The servers can perform backend operations such as matrix calculations, parallel calculations, machine learning (ML) training, and the like. Examples of servers used by the hardware platform 310 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 310 can include Infrastructure as a Service (IaaS) resources, which are computing resources (e.g., servers, memory, etc.) offered by a cloud services provider. The hardware platform 310 can also include computer memory for storing data about the AI model, application of the AI model, and training data for the AI model. The computer memory can be a form of random-access memory (RAM), such as dynamic RAM, static RAM, and non-volatile RAM.

The software libraries 312 can be thought of suites of data and programming code, including executables, used to control and optimize the computing resources of the hardware platform 310. The programming code can include low-level primitives (e.g., fundamental language elements) that form the foundation of one or more low-level programming languages, such that servers of the hardware platform 310 can use the low-level primitives to carry out specific operations. The low-level programming languages do not require much, if any, abstraction from a computing resource's instruction set architecture, allowing them to run quickly with a small memory footprint. Examples of software libraries 312 that can be included in the AI system 300 include Intel Math Kernel Library, Nvidia cuDNN, Eigen, and Open BLAS. In some implementations, a software library 312 can include executables to optimize performance of various fuzzy logic operations performed by the fuzzy logic engine 340 of FIG. 3B.

The structure layer 304 can include an ML framework 314 and an algorithm 316. The ML framework 314 can be thought of as an interface, library, or tool that allows users to build and deploy the AI model. The ML framework 314 can include an open-source library, an application programming interface (API), a gradient-boosting library, an ensemble method, and/or a deep learning toolkit that work with the layers of the AI system facilitate development of the AI model. For example, the ML framework 314 can distribute processes for application or training of the AI model across multiple resources in the hardware platform 310. The ML framework 314 can also include a set of pre-built components that have the functionality to implement and train the AI model and allow users to use pre-built functions and classes to construct and train the AI model. Thus, the ML framework 314 can be used to facilitate data engineering, development, hyperparameter tuning, testing, and training for the AI model. Examples of ML frameworks 314 that can be used in the AI system 300 include TensorFlow, PyTorch, Scikit-Learn, Scikit-Fuzzy, Keras, Caffe, LightGBM, Random Forest, Fuzzy Logic Toolbox, and Amazon Web Services.

The algorithm 316 can be an organized set of computer-executable operations used to generate output data from a set of input data and can be described using pseudocode. The algorithm 316 can include program code that allows the computing resources to learn from new input data and create new/modified outputs based on what was learned. In some implementations, the algorithm 316 can build the AI model through being trained while running computing resources of the hardware platform 310. This training allows the algorithm 316 to make predictions or decisions without being explicitly programmed to do so. Once trained, the algorithm 316 can run at the computing resources as part of the AI model to make predictions or decisions, improve computing resource performance, or perform tasks. The algorithm 316 can be trained using supervised learning, unsupervised learning, semi-supervised learning, and/or reinforcement learning.

Using supervised learning, the algorithm 316 can be trained to learn patterns (e.g., match input data to output data) based on labeled training data, such as transaction categorization data, entity behavior map data, and so forth. Supervised learning can involve classification and/or regression. Classification techniques involve teaching the algorithm 316 to identify a category of new observations based on training data and are used when the input data for the algorithm 316 is discrete. Said differently, when learning through classification techniques, the algorithm 316 receives training data labeled with categories (e.g., classes) and determines how features observed in the training data (e.g., merchant identifiers, dates, debit or credit transaction type, channels, locations, and so forth) relate to the categories, such as classifications 224 discussed in relation to FIG. 2B. Once trained, the algorithm 316 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 316 is continuous. Regression techniques can be used to train the algorithm 316 to predict or forecast relationships between variables. To train the algorithm 316 using regression techniques, a user can select a regression method for estimating the parameters of the model. The user collects and labels training data that is input to the algorithm 316 such that the algorithm 316 is trained to understand the relationship between data features and the dependent variable(s). Once trained, the algorithm 316 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations. In another example implementation, regression techniques can be used to generate predictions for various recurrence items 226 of FIG. 2B or other similar items.

Under unsupervised learning, the algorithm 316 learns patterns from unlabeled training data. In particular, the algorithm 316 is trained to learn hidden patterns and insights of input data, which can be used for data exploration or for generating new data. Here, the algorithm 316 does not have a predefined output, unlike the labels output when the algorithm 316 is trained using supervised learning. Said another way, unsupervised learning is used to train the algorithm 316 to find an underlying structure of a set of data, group the data according to similarities, and represent that set of data in a compressed format. The platform can use unsupervised learning to identify patterns in input data, such as the patterns relating to recurrence items 226 of FIG. 2B.

The model layer 306 implements the AI model using data from the data layer and the algorithm 316 and ML framework 314 from the structure layer 304, thus enabling decision-making capabilities of the AI system 300. The model layer 306 can include a model structure 320, model parameters 322, a loss function engine 324, an optimizer 326, and/or a regularization engine 328.

The model structure 320 describes the architecture of the AI model of the AI system 300. The model structure 320 defines the complexity of the pattern/relationship that the AI model expresses. Examples of structures that can be used as the model structure 320 include decision trees, support vector machines, regression analyses, Bayesian networks, Gaussian processes, genetic algorithms, and artificial neural networks (or, simply, neural networks). The model structure 320 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 320 may include one or more hidden layers of nodes between the input and output layers. The model structure 320 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs). According to various implementations, neural networks can be used, for example, by the insight generator 160 of FIG. 1A.

The model parameters 322 represent the relationships learned during training and can be used to make predictions and decisions based on input data. The model parameters 322 can weight and bias the nodes and connections of the model structure 320. For instance, when the model structure 320 is a neural network, the model parameters 322 can weight and bias the nodes in each layer of the neural networks, such that the weights determine the strength of the nodes and the biases determine the thresholds for the activation functions of each node. The model parameters 322, in conjunction with the activation functions of the nodes, determine how input data is transformed into desired outputs. The model parameters 322 can be determined and/or altered during training of the algorithm 316.

The loss function engine 324 can determine a loss function, which is a metric used to evaluate the AI model's performance during training. For instance, the loss function engine 324 can measure the difference between a predicted output of the AI model and the actual output of the AI model and is used to guide optimization of the AI model during training to minimize the loss function.

The optimizer 326 adjusts the model parameters 322 to minimize the loss function during training of the algorithm 316. In other words, the optimizer 326 uses the loss function generated by the loss function engine 324 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 326 used may be determined based on the type of model structure 320 and the size of data and the computing resources available in the data layer 302.

The regularization engine 328 executes regularization operations. Regularization is a technique that prevents over- and under-fitting of the AI model. Overfitting occurs when the algorithm 316 is overly complex and too adapted to the training data, which can result in poor performance of the AI model. Underfitting occurs when the algorithm 316 is unable to recognize even basic patterns from the training data such that it cannot perform well on training data or on validation data. The optimizer 326 can apply one or more regularization techniques to fit the algorithm 316 to the training data properly, which helps constraint the resulting AI model and improves its ability for generalized application. Examples of regularization techniques include lasso (L1) regularization, ridge (L2) regularization, and elastic (L1 and L2 regularization).

The application layer 308 describes how the AI system 300 is used to solve problem or perform tasks. In an example implementation, the application layer 308 can include the publisher 170 of the data analytics and contextualization platform 110 of FIG. 1A. For example, the publisher 170 can generate data files and/or messages that include model outputs.

FIG. 3B illustrates an example fuzzy logic engine 340 of the data analytics and contextualization platform 110 of FIG. 1A, in accordance with some implementations of the present technology. According to various implementations, the AI/ML engine(s) 132, 142, 144, 146, 148, 152, and/or 162 can include elements of the fuzzy logic engine 340. For example, the AI/ML engine 142 of the contextualizer 140 can use fuzzy logic on unstructured data items extracted from input data in order to generate a set of contextual items. Contextual items can include, for example, various items described in relation to FIG. 2B, such as classification items 224, recurrence items 226, entity/merchant 228, channel 230, location 240, and so forth.

The fuzzy logic engine 340 can be structured to perform textual analysis using natural language processing (NLP) or a similar technique. The textual analysis can include standardizing various items (tokens) extracted from input data, such as transaction records (192a, 192b, 192c) of the input dataset 192 of FIG. 1B, raw transaction data 222 of FIG. 2B, transaction descriptions 252 of FIG. 2C, and so forth. For example, the fuzzy logic engine 340 can extract a set of abbreviated items 252a from transaction descriptions 252 for at least two transactions of a set of transactions. In some implementations, if the extracted abbreviated items 252a meet a predetermined threshold of similarity (e.g., a minimum count of similar consecutive characters, a minimum count of similar consecutive phrases, an overlap by at least a threshold amount of positions within transaction descriptions 252 and so forth), then the extracted abbreviated items 252a are determined to match (i.e. can both/all be identified as a particular contextual item, such as a merchant entity descriptor). In some implementations, if the extracted abbreviated items 252a correspond to a particular item in an ontology, such as an ontology of a base feature store 145a and/or a custom feature store 145b, then the extracted abbreviated items 252a are also determined to match. For example, a first extracted abbreviated item 252a can include a character sequence "AMZN" and a second extracted abbreviated item 252a can include a character sequence "AMAZON". If both sequences can be found in a particular ontology and correspond to the same entity (e.g., "Amazon.com"), then an inference can be made that the items match. These items can then be classified (258, 260) and/or recurrence patterns (262, 264, 280, 282, 284) can be determined therefor.

To carry out the aforementioned operations, the fuzzy logic engine 340 can include a fuzzifier 346, which accepts input items 344 (e.g., tokens/items extracted from raw transaction data 222 of FIG. 2B, transaction description 252 of FIG. 2C, and so forth). The input items can include various attributes, such as, for example, item length, item location, presence of a particular character sequence, and so forth. For example, a particular input item can include the character sequence "AMZN" in the 0-3 position. The fuzzifier 346 can apply a membership function 347 to a particular attribute or combination of attributes to classify the particular attribute of combination of attributes. For example, characters in the 0-3 position can be matched to one of a set of numerical values in the range 0-1 that denote the likelihood of the characters denoting a merchant according to the rules 348. The rules 348, for example, can be based on various data interchange formats, such as the Open Banking, ACH, and so forth, which can specify locations, allowable values, and so forth for various items in transaction data such that items can be identified based on their respective locations within input data (e.g., "if an item is in the 0-3 position, the item denotes a merchant"). As another example, the character sequence "AMZN" can denote a merchant even if not found in a particular position based on, for example, the determined similarity of the character sequence to an item in a reference ontology. The determined similarity can be based on a degree of certainty, such as a minimum count of consecutive characters corresponding to a particular degree of certainty, and a higher-than-minimum count corresponding to a comparatively higher degree of certainty.

More generally, the inference engine 350 can use the rules 348 on the output of the fuzzifier 346 in order to determine the degree of correspondence between the input item 344 and the rules 348. The defuzzifier 352 can generate an output item 354 based on the rules 348. Continuing the example, the rules 348 can state that if a particular item is found in a particular position, or if a particular character sequence in any position is found in a reference ontology that lists merchant entities, then the input item 344 relates to a particular merchant entity. The output item 354 can, for example, output an ontology item and its corresponding value (e.g., "Amazon.com.")

One of skill will appreciate that the inference engine 350 can be configured to access appropriate rule sets to various other contextual items, such as classification items 224, recurrence items 226 (amount, time, type, frequency), entity/merchant 228, channel 230, and/or location 240 of FIG. 2B, or other items.

Figure 4:
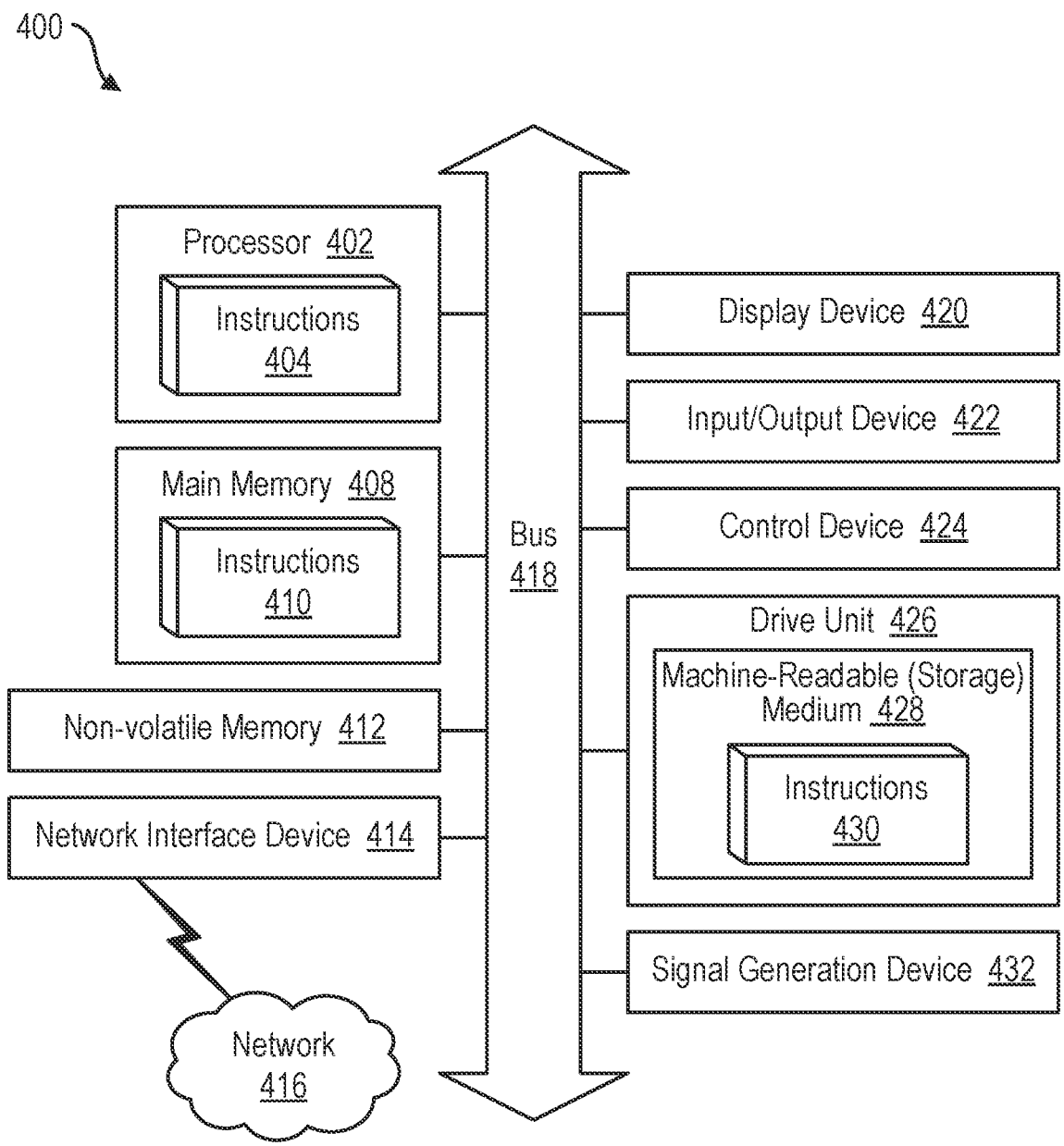
FIG. 4 is a block diagram showing some of the components typically incorporated in at least some of the computer systems and other devices on which the data analytics and contextualization platform operates in accordance with some implementations of the present technology.

Example Computing Environment of the Data Analytics and Contextualization Platform FIG. 4 is a block diagram showing some of the components typically incorporated in at least some of the computer systems and other devices 400 on which the disclosed data analytics and contextualization platform operates in accordance with some implementations of the present technology. As shown, an example computer system 400 can include: one or more processors 402, main memory 408, non-volatile memory 410, a network interface device 414, video display device 420, an input/output device 422, a control device 424 (e.g., keyboard and pointing device), a drive unit 426 that includes a machine-readable medium 428, and a signal generation device 432 that are communicatively connected to a bus 418. The bus 418 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computer system 400 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 400. In some implementations, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 414 enables the computer system 400 to exchange data in a network 416 with an entity that is external to the computing system 400 through any communication protocol supported by the computer system 400 and the external entity. Examples of the network interface device 414 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 408, non-volatile memory 412, machine-readable medium 428) can be local, remote, or distributed. Although shown as a single medium, the machine-readable medium 428 can include multiple media (e.g., a centralized/distributed database and/or associated caches and servers) that store one or more sets of instructions 430. The machine-readable (storage) medium 428 can include any medium that is capable of storing, encoding, or carrying a set of instructions for execution by the computer system 400. The machine-readable medium 428 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 410, 430) set at various times in various memory and storage devices in computing device(s). When read and executed by the processor 402, the instruction(s) cause the computer system 400 to perform operations to execute elements involving the various aspects of the disclosure.

Figure 5:
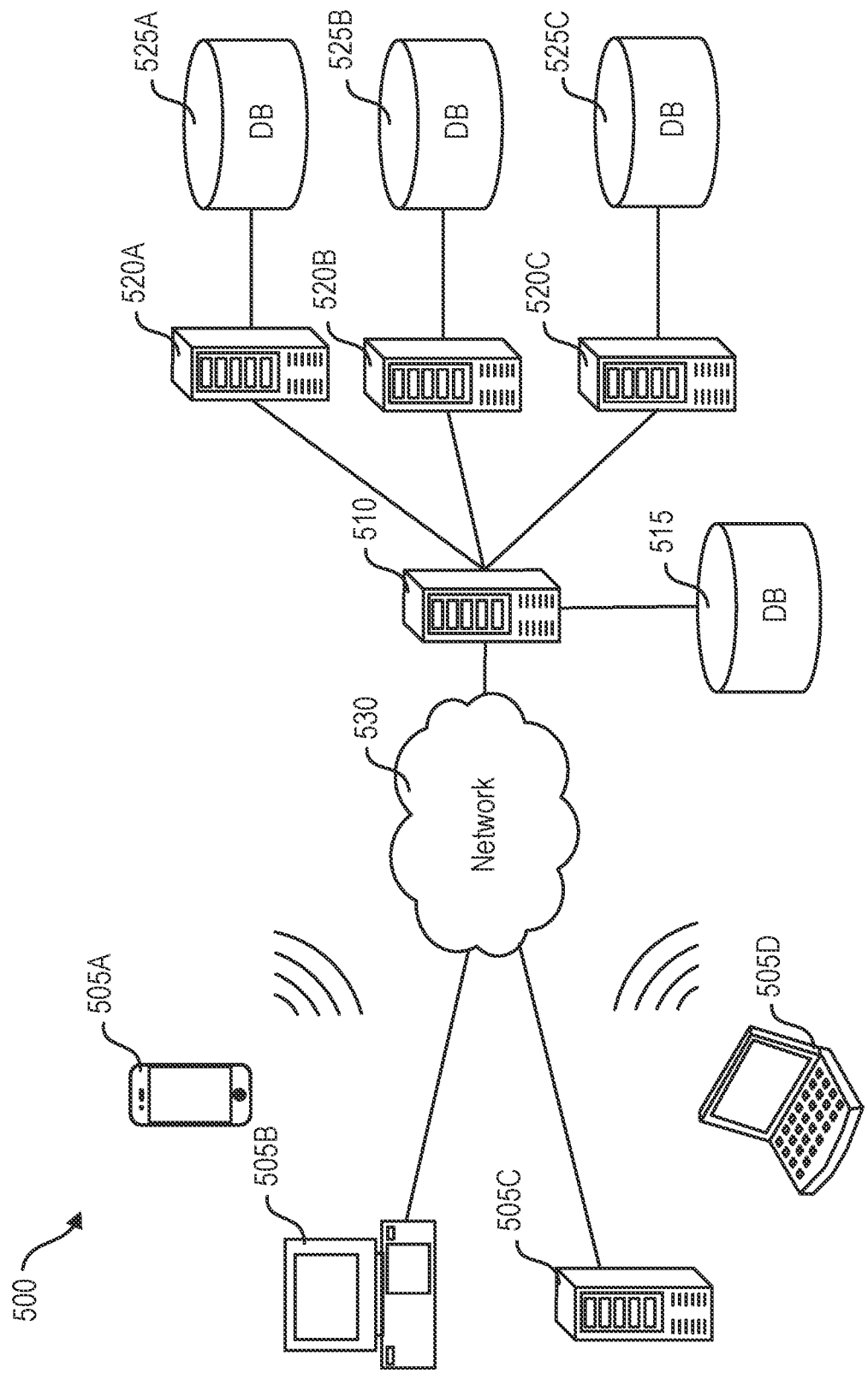
FIG. 5 is a system diagram illustrating an example of a computing environment in which the data analytics and contextualization platform operates in some implementations of the present technology.

FIG. 5 is a system diagram illustrating an example of a computing environment in which the disclosed data analytics and contextualization platform operates in some implementations. In some implementations, environment 500 includes one or more client computing devices 505A-D, examples of which can host the data analytics and contextualization platform 110 of FIG. 1A. Client computing devices 505 operate in a networked environment using logical connections through network 530 to one or more remote computers, such as a server computing device.

In some implementations, server 510 is an edge server which receives client requests and coordinates fulfillment of those requests through other servers, such as servers 520A-C. In some implementations, server computing devices 510 and 520 comprise computing systems, such as the data analytics and contextualization platform 110 of FIG. 1A. Though each server computing device 510 and 520 is displayed logically as a single server, server computing devices can each be a distributed computing environment encompassing multiple computing devices located at the same or at geographically disparate physical locations. In some implementations, each server 520 corresponds to a group of servers.

Client computing devices 505 and server computing devices 510 and 520 can each act as a server or client to other server or client devices. In some implementations, servers (510, 520A-C) connect to a corresponding database (515, 525A-C). As discussed above, each server 520 can correspond to a group of servers, and each of these servers can share a database or can have its own database. Databases 515 and 525 warehouse (e.g., store) information such as transaction data, feature data, entity data, classifier data, recurrence data, entity behavior map data, indexes, smart variables, indicators, configuration data and so forth. Though databases 515 and 525 are displayed logically as single units, databases 515 and 525 can each be a distributed computing environment encompassing multiple computing devices, can be located within their corresponding server, or can be located at the same or at geographically disparate physical locations.

Network 530 can be a local area network (LAN) or a wide area network (WAN), but can also be other wired or wireless networks. In some implementations, network 530 is the Internet or some other public or private network. Client computing devices 505 are connected to network 530 through a network interface, such as by wired or wireless communication. While the connections between server 510 and servers 520 are shown as separate connections, these connections can be any kind of local, wide area, wired, or wireless network, including network 530 or a separate public or private network.

Example Use Cases of the Data Analytics and Contextualization Platform

Various use cases for the data analytics and contextualization platform 110 of FIG. 1A are described in relation to FIGS. 6-10.

Figure 6:
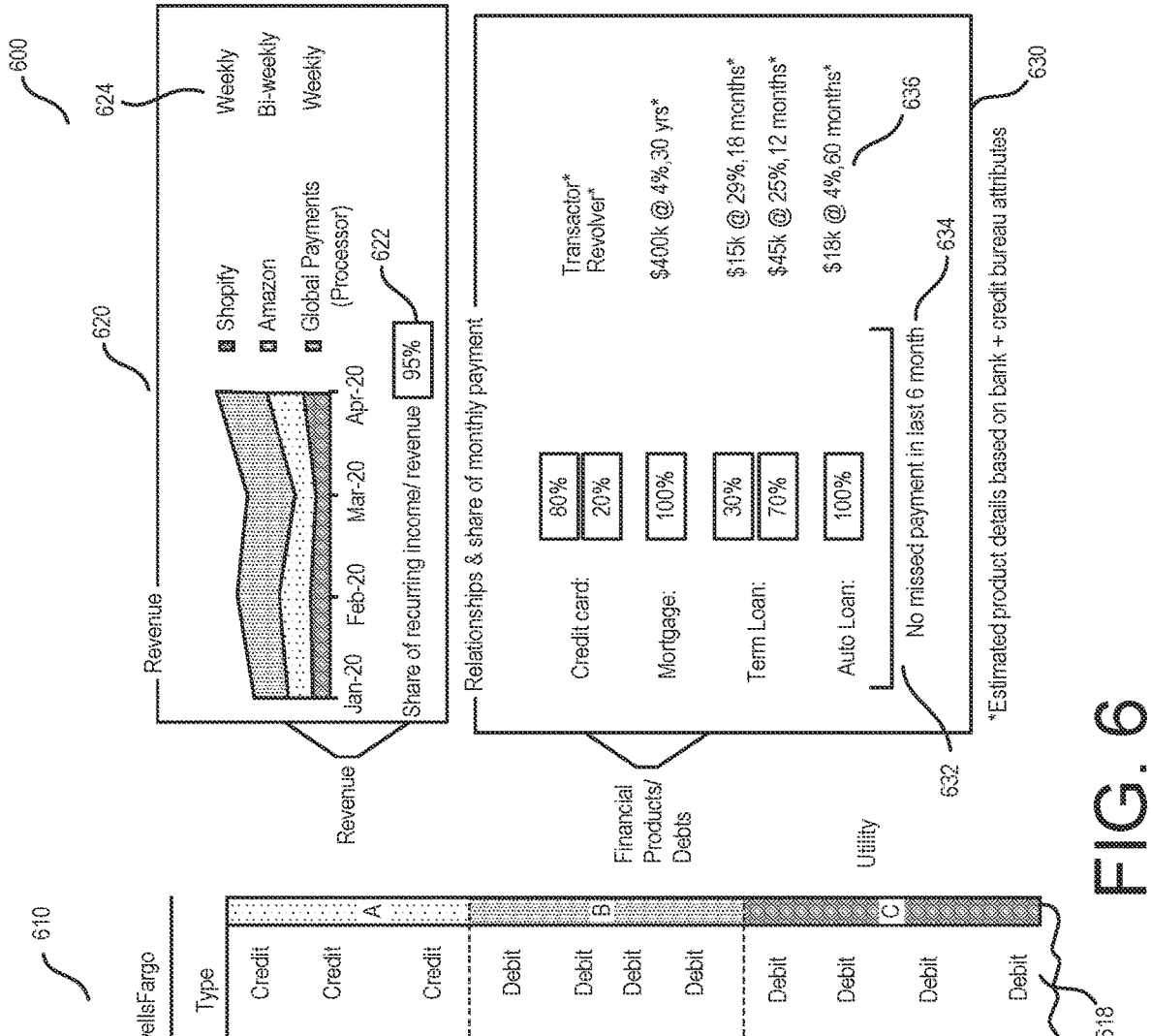
FIGS. 6-10 illustrate example use cases of the data analytics and contextualization platform, in accordance with some implementations of the present technology.

According to an example use case 600 of FIG. 6, inferences 610 can be made about a particular customer based on input data items. Input data items, included in one or more transaction datasets, such as credit card transactions, debit card transactions, deposit account transactions, and so forth, can include a date 612, amount 614, description 616, and/or transaction type 618. The platform can parse the description fields to extract various tokens. The tokens can, for example, correspond to various transaction entity/merchant identifiers (e.g., "SHOPIFY", "AMAZON", "CHASE CREDIT", "VZ WIRELESS"). Based on the entity identifier, which can be extracted using fuzzy logic and cross-referenced to an ontology, various transaction categories can be determined. As shown, the categories can include revenue 620 and tradelines (financial products and utility) 630. For example, transactions of a particular type (debit/credit) can correspond to employer or other revenue payments (in this use case, revenue from retail sales). The revenue periodicity 624 can be determined using the transaction date in combination with transaction type and/or with a cross-referenced token extracted from transaction description. A share of recurring income or revenue 622 can be determined for a particular group of transactions (e.g., for transactions associated with a particular category that maps to an extracted token, such as retail sales). Further, as shown, the categories can include various tradelines 630, and the platform can use the transaction amounts 614 to calculate payment percentages 632 (e.g., a ratio of a payment to account balance, a ratio of a payment to account revenue for the corresponding period). The platform can also use payment periodicity values to determine whether any payments due were missed in a particular time period 634. The platform can also cross-reference additional data (e.g., credit data, Open Banking data) to determine tradeline balances and terms 630.

Figure 7:
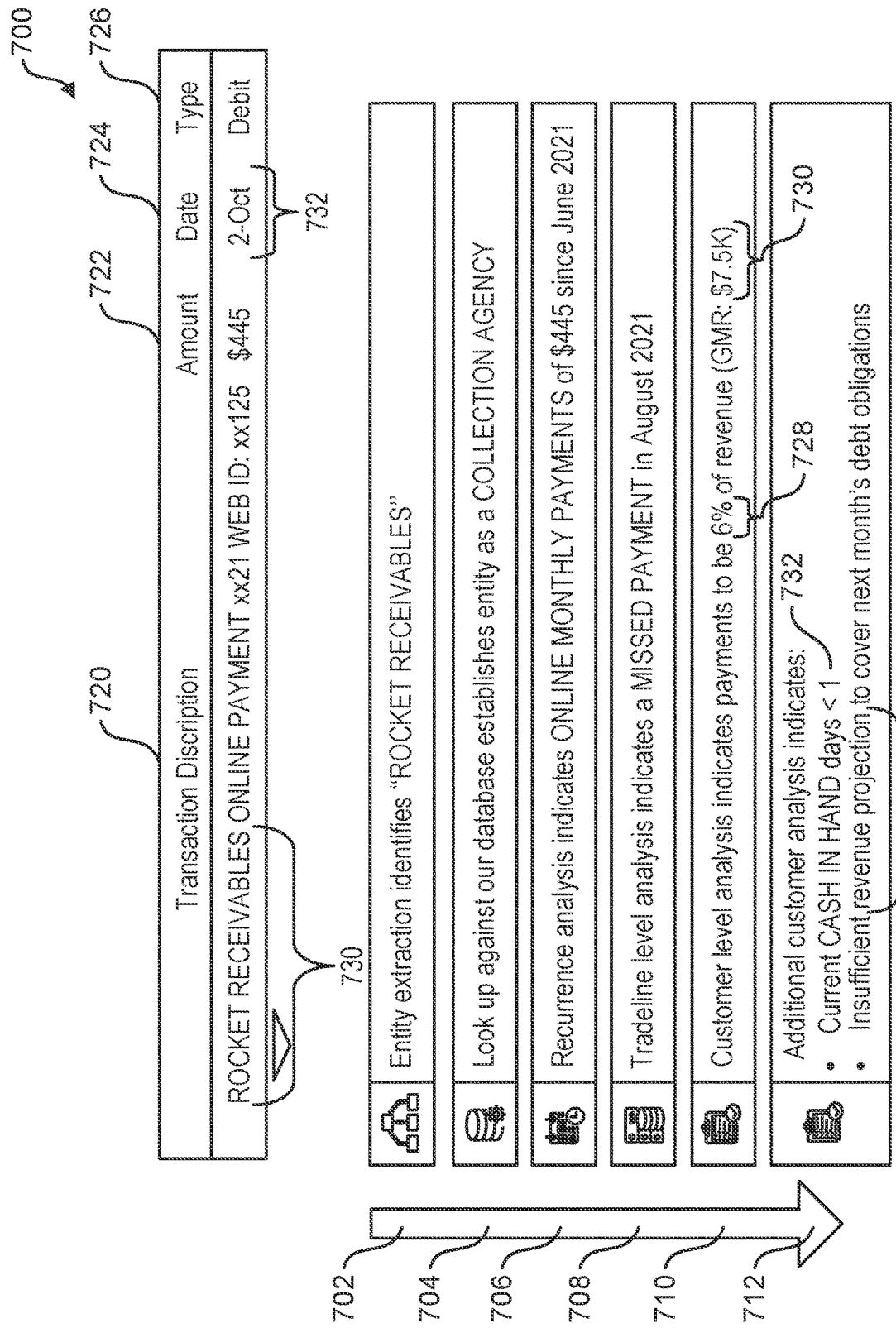

According to an example use case 700 of FIG. 7, inferences 702-712 can be made about a particular customer based on input data items. Input data items, included in one or more transaction datasets, such as credit card transactions, debit card transactions, deposit account transactions, and so forth, can include a description 720, amount 722, datetime 724 (including, for example, a date 732), and transaction type 726. The platform can parse the description fields to extract various token, such as entity description 730, which can be extracted using fuzzy logic and cross-referenced to an ontology. Here, at 702, entity extraction can identify a particular token. At 704, using the token (e.g., using fuzzy logic to map the token to a particular item in an ontology), it can be determined that the token describes a particular category (e.g., collection agency). At 706, other contextual items, such as channel (online), periodicity (monthly) and amount ($445) can be determined to describe tradeline-level activity. At 708, recurrence analysis based on periodicity can make an inference that a particular payment pattern (a gap of two months for monthly payments) indicates a missed monthly payment. A7 710, customer-level indexes and values, such as percentage 728 of gross monthly revenue 730, can be generated/determined. At 712, additional customer-level calculations, such as cash-in-hand days 732, monthly revenue projections 734 (e.g., gross monthly revenue minus projected cash outflows), and so forth, can be performed.

Figure 8:
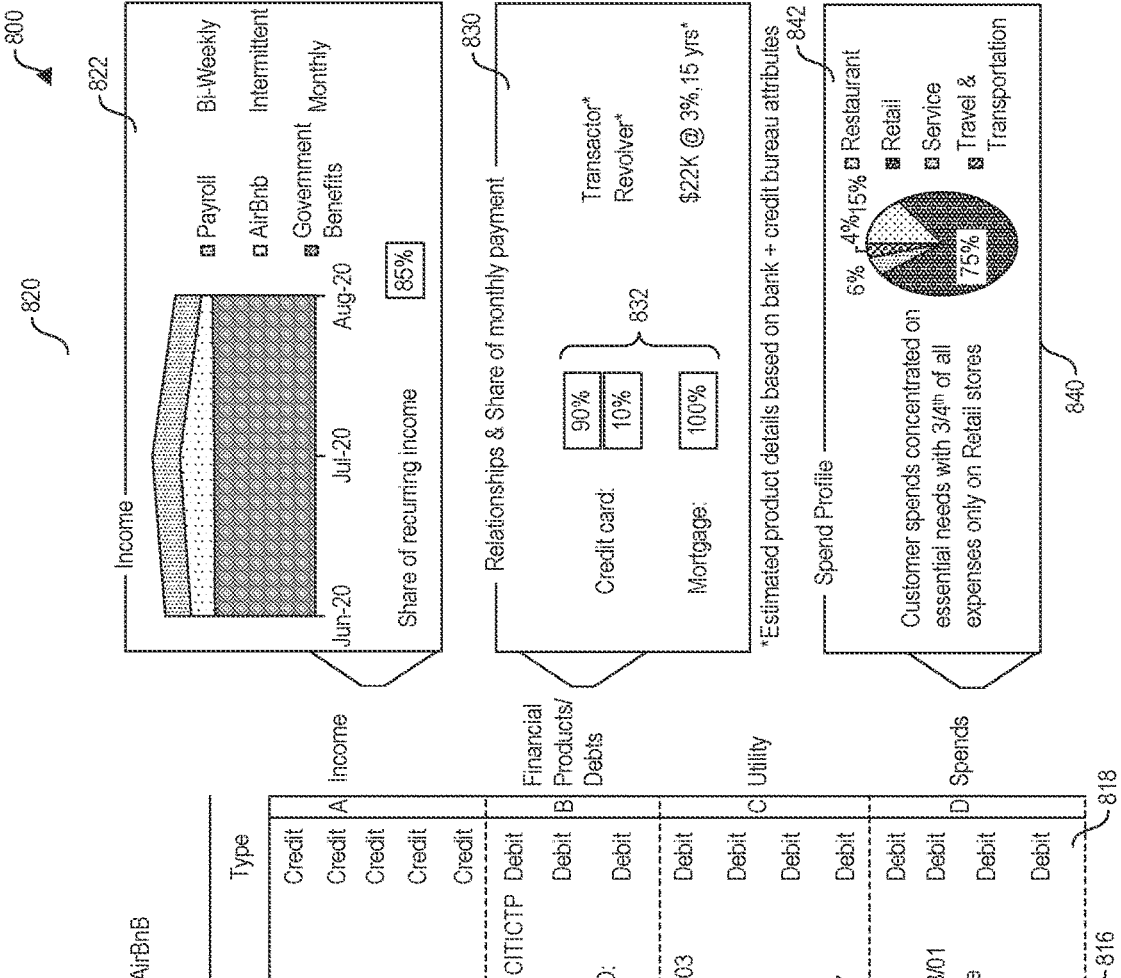

According to an example use case 800 of FIG. 8, inferences 810 can be made about a particular customer based on input data items. Input data items, included in one or more transaction datasets, such as credit card transactions, debit card transactions, deposit account transactions, and so forth, can include a date 812, amount 814, description 816, and/or transaction type 818. The platform can parse the description fields to extract various tokens. The tokens can, for example, correspond to various transaction entity/merchant identifiers (e.g., "PIZZA", "SERVICE STATION"). Based on the entity identifier, which can be extracted using fuzzy logic and cross-referenced to an ontology, various transaction categories can be determined. As shown, the categories can include revenue 820, tradelines (financial products and utility) 830, and consumer spending (e.g., discretionary spending) 840. The amounts 814 can be used to calculate shares 842 of spending by spending category. Spending categories can be determined by cross-referencing tokens to ontologies to identify merchants and determine merchant categories.

Figure 9:
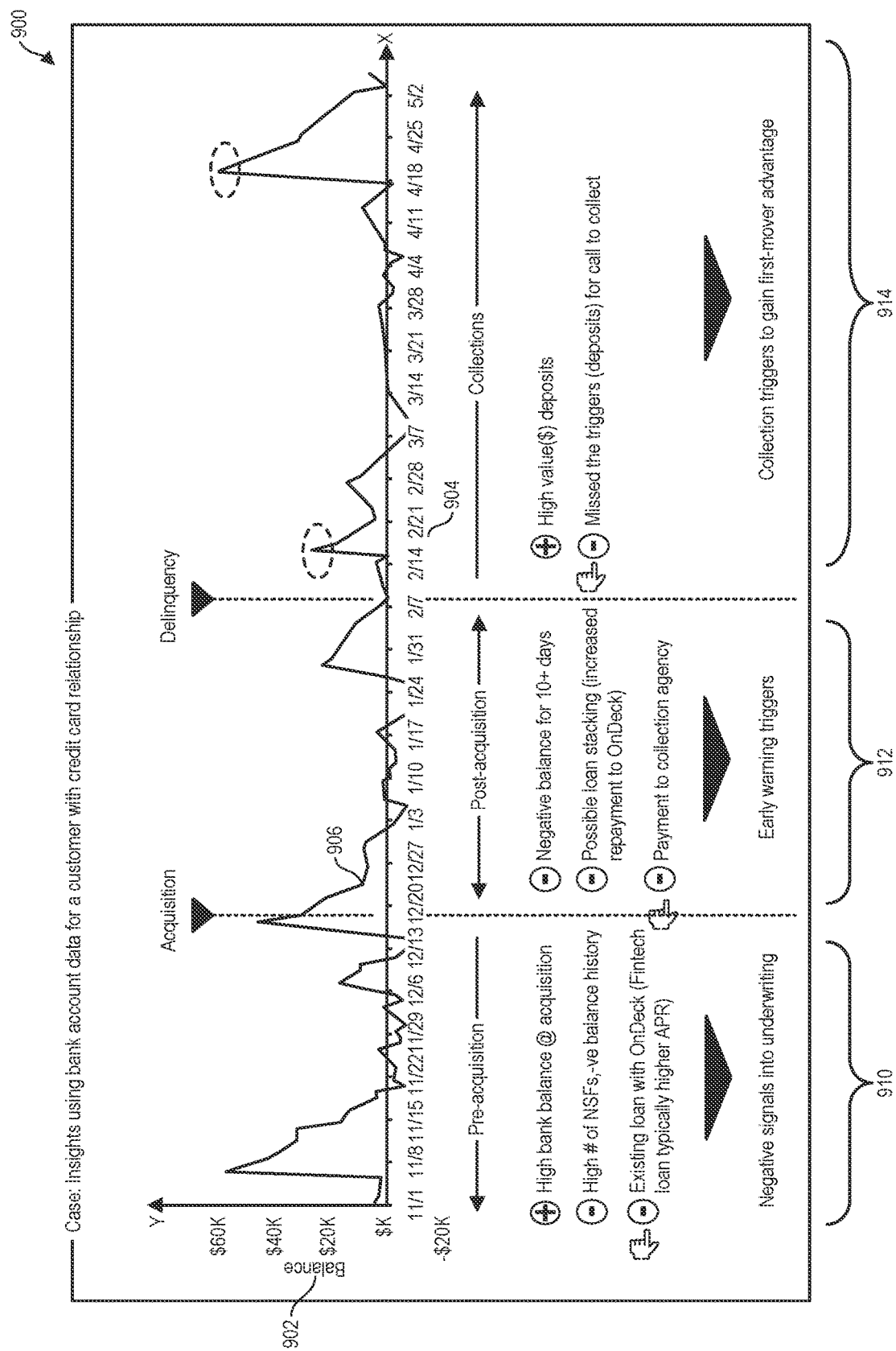

According to an example use case 900 of FIG. 9, inferences 910-914 can be made about a particular tradeline or customer based on input data items. Input data items, included in one or more transaction datasets, such as credit card transactions, debit card transactions, deposit account transactions, and so forth, can include a date, amount, description, and/or transaction type. After determining a particular tradeline using input data items (as described, for example, in reference to FIG. 6 and elsewhere herein), the platform can cross-reference (e.g., using a customer identifier corresponding to a transaction or set of transactions that served as the basis for determining the tradeline) third-party data, such as credit data, account data, and so forth, to determine overall outstanding balance 902. Here, the outstanding balance 902 is a loan balance for a lender. The platform can perform analytics on the input data to cross-reference the outstanding balance to payment amounts at various points in time in order to generate an outstanding balance trendline 906. The platform can further cross-reference various data points of interest on the trendline (for example, by referencing account data, such as when a particular account was open, acquired by a particular entity, became delinquent, and so forth) to visualize the relationship of these data points to the trendline 906.

Figure 10:
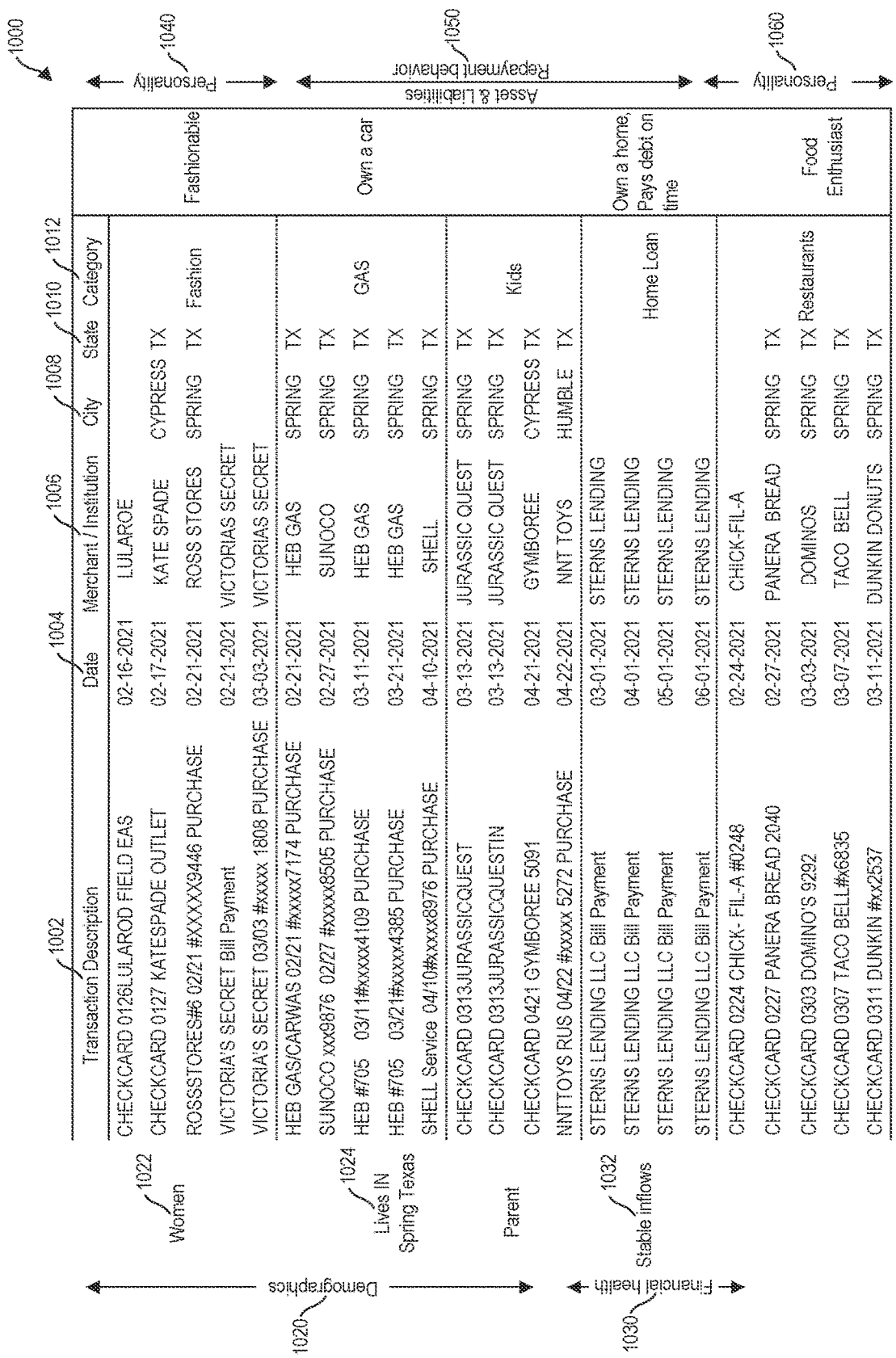

According to an example use case 1000 of FIG. 10, input transaction data, such as description 1002, can be tokenized using fuzzy logic and cross-referenced to an ontology in order to determine and label the transaction with various contextual items, such as merchant/institution 1006, city 1008, state 1010, and category 1012. The contextual items, such as transaction category, 1012, can be used to make inferences about demographics 1020, financial health 1030, personality 1040, payment behavior 1050 and so forth for a particular set of transactions.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

We claim:

1. A computing system comprising at least one processor, at least one memory, and one or more non-transitory computer readable media storing instructions, which when executed by the at least one processor, perform operations for artificial intelligence/machine learning (AI/ML) based modeling and simulation and generating a subscriber-customized reduced-size feature set, the operations comprising:

acquiring, by a platform instance of the computing system, an input dataset comprising a set of structured items and unstructured textual data that relates to one or more items in the input dataset; and reducing a size of the input dataset for transmission, via an electronic communication channel, to a target computing system by generating a labeled enriched feature set that corresponds to a set of automatically determined contextual items, comprising:

extracting the unstructured textual data from the input dataset;

using fuzzy logic, generating, by the platform instance, the set of contextual items using the extracted unstructured textual data;

labeling a set of items in the input dataset with the set of contextual items generated for a particular item in the set of items;

using a labeled particular item from the set of items in the labeled enriched feature set, generating a set of entity behavior maps comprising one or more of:

a transaction map, a customer map, or a tradeline map, wherein each entity behavior map in the set of entity behavior maps includes a set of features selected from the labeled enriched feature set based on a first particular label of a particular item in the set of items such that a particular entity behavior map corresponds to a particular contextual item;

for each of the set of entity behavior maps, using a classification of the entity behavior map, the classification corresponding to the transaction map, the customer map, or the tradeline map, determining a set of operations to populate the entity behavior map, a particular operation in the set of operations being one of (i) AI/ML modeling operations performed by a trained neural network, (ii) an aggregation operation, or (iii) a summarization operation; and using the particular contextual item that corresponds to the classification of the entity behavior map, performing operations comprising:

populating the entity behavior map;

using the classification and a target system identifier for the target computing system, querying a feature store to determine a particular dimension of the entity behavior map to transmit to the target computing system, wherein the particular dimension is a portion of the entity behavior map;

generating an electronic message for a reduced-size transmission, wherein the electronic message comprises the particular dimension; and causing the target computing system to process the reduced-side transmission for publication of the dimension of the entity behavior map at the target computing system.

2. The system of claim 1, wherein generating by the platform instance the set of contextual items comprises:

extracting a token from the unstructured textual data; and referencing an ontology to determine whether the token matches an item in the ontology within a predetermined degree of certainty, wherein the set of contextual items includes an item descriptor class from the ontology.

3. The system of claim 2, wherein the ontology corresponds to a feature definition criterion from the feature store associated with the target computing system, the target computing system being a particular subscriber computing system having a particular associated feature store; and wherein a particular AI/ML modeling operation for the entity behavior map is performed based on the feature definition criterion.

4. The system of claim 3, wherein performing the AI/ML modeling operation comprises executing a machine learning model, and wherein the machine learning model operates on items extracted from the input dataset, the operations further comprising:

using the labeled particular item, generating an input feature according to the feature definition criterion corresponding to a particular label; and using the input feature, executing a machine learning operation to perform the AI/ML modeling operation.

5. The system of claim 4, the AI/ML modeling operation comprising at least one of item recurrence analytics, item tradeline analytics, item descriptor class analytics, item location analytics, entity income analytics, or entity employer analytics.

6. The system of claim 1, the operations comprising acquiring the input dataset from the target computing system.

7. The system of claim 1, the operations comprising acquiring the input dataset from a third-party computing system relative to the target computing system, wherein the input dataset includes data contributed by an entity associated with the target computing system.

8. The system of claim 1, wherein the target computing system is one of a plurality of target computing systems and the platform instance is one of a plurality of platform instances, and wherein each particular target computing system of the plurality of target computing systems is associated with a particular platform instance configured for a particular subscriber.

9. The system of claim 1, wherein labeling a particular item comprises generating metadata for the particular item using the contextual item.

10. The system of claim 1, the operations comprising:
reducing a size of at least a portion of the input dataset by quantizing values in the at least a portion of the input dataset; and
using the quantized values to generate numerical values for the particular dimension transmitted to the target computing system.

11. A computer-implemented method for artificial intelligence/machine learning (AI/ML) based modeling and simulation and generating a subscriber-customized reduced-size feature set, the method comprising:
acquiring, by a platform instance of a computing system, an input dataset comprising a set of structured items and unstructured textual data that relates to one or more items in the input dataset;
reducing a size of the input dataset for transmission, via an electronic communication channel, to a target computing system by generating a labeled enriched feature set that corresponds to a set of automatically determined contextual items, comprising:
extracting the unstructured textual data from the input dataset; and
using fuzzy logic, generating, by the platform instance, the set of contextual items using the extracted unstructured textual data;
labeling a set of items in the input dataset with the set of contextual items;
using a labeled particular item from the set of items in the labeled enriched feature set,
generating a set of entity behavior maps comprising one or more of: a transaction map, a customer map, or a tradeline map
wherein each entity behavior map in the set of entity behavior maps includes a set of features selected from the labeled enriched feature set based on a first particular label of the particular item such that a particular entity behavior map corresponds to a particular contextual item;
for each of the set of entity behavior maps,
using a classification of the entity behavior map, the classification corresponding to the transaction map, the customer map, or the tradeline map, determining a set of operations to populate the entity behavior map, a particular operation in the set of operations being one of (i) AI/ML modeling operations performed by a trained neural network, (ii) an aggregation operation, or (iii) a summarization operation; and
using the particular contextual item that corresponds to the classification of the entity behavior map, performing operations comprising:
populating the entity behavior map;
using the classification and a target system identifier for the target computing system, querying a feature store to determine a particular dimension of the entity behavior map to transmit to the target computing system, wherein the particular dimension is a portion of the entity behavior map;
generating an electronic message for a reduced-size transmission, wherein the electronic message comprises the particular dimension; and
causing the target computing system to process the reduced-side transmission for publication of the dimension of the entity behavior map at the target computing system.

12. The method of claim 11, wherein generating by the platform instance the set of contextual items comprises:
extracting a token from the unstructured textual data; and
referencing an ontology to determine whether the token matches an item in the ontology within a predetermined degree of certainty,
wherein the set of contextual items includes an item descriptor class from the ontology.

13. The method of claim 12,
wherein the ontology corresponds to a feature definition criterion from the feature store associated with the target computing system, the target computing system being a particular subscriber computing system having a particular associated feature store; and
wherein a particular AI/ML modeling operation for the entity behavior map is performed based on the feature definition criterion.

14. The method of claim 13,
wherein performing the AI/ML modeling operation comprises executing a machine learning model, and
wherein the machine learning model operates on items extracted from the input dataset,
the operations further comprising:
using the labeled particular item, generating an input feature according to the feature definition criterion corresponding to a particular label; and
using the input feature, executing a machine learning operation to perform the AI/ML modeling operation.

15. The method of claim 14, the AI/ML modeling operation comprising at least one of item recurrence analytics, item tradeline analytics, item descriptor class analytics, item location analytics, entity income analytics, or entity employer analytics.

16. Method of claim 11, further comprising acquiring the input dataset from the target computing system.

17. The method of claim 11, further comprising acquiring the input dataset from a third-party computing system relative to the target computing system, wherein the input dataset includes data contributed by an entity associated with the target computing system.

18. The method of claim 11, wherein the target computing system is one of a plurality of target computing systems and the platform instance is one of a plurality of platform instances, and wherein each particular target computing system of the plurality of target computing systems is associated with a particular platform instance configured for a particular subscriber.

19. The method of claim 11, wherein labeling a particular item comprises generating metadata for the particular item using the contextual item.

20. One or more non-transitory computer-readable media having computer-executable instructions stored thereon, the instructions, when executed by at least one process of a computing system, performing operations for artificial intelligence/machine learning (AI/ML) based modeling and simulation and generating a subscriber-customized reduced-size feature set, the operations comprising:
acquiring, by a platform instance of the computing system, an input dataset comprising a set of structured items and unstructured textual data that relates to one or more items in the input dataset; and
reducing a size of the input dataset for transmission, via an electronic communication channel, to a target computing system by generating a labeled enriched feature set that corresponds to a set of automatically determined contextual items, comprising:

extracting the unstructured textual data from the input dataset;

using fuzzy logic, generating, by the platform instance, the set of contextual items using the extracted unstructured textual data;

labeling a set of items in the input dataset with the set of contextual items generated for a particular item in the set of items;

using a labeled particular item from the set of items in the labeled enriched feature set,
  generating a set of entity behavior maps comprising one or more of:
    a transaction map, a customer map, or a tradeline map
  wherein each entity behavior map in the set of entity behavior maps includes a set of features selected from the labeled enriched feature set based on a first particular label of a particular item in the set of items such that a particular entity behavior map corresponds to a particular contextual item;

for each of the set of entity behavior maps,
  using a classification of the entity behavior map, the classification corresponding to the transaction map, the customer map, or the tradeline map, determining a set of operations to populate the entity behavior map, a particular operation in the set of operations being one of (i) AI/ML modeling operations performed by a trained neural network, (ii) an aggregation operation, or (iii) a summarization operation; and
  using the particular contextual item that corresponds to the classification of the entity behavior map, performing operations comprising:
    populating the entity behavior map;
    using the classification and a target system identifier for the target computing system, querying a feature store to determine a particular dimension of the entity behavior map to transmit to the target computing system, wherein the particular dimension is a portion of the entity behavior map;
    generating an electronic message for a reduced-size transmission, wherein the electronic message comprises the particular dimension; and
    causing the target computing system to process a reduced-side transmission for publication of the dimension of the entity behavior map at the target computing system.

21. The media of claim 20, wherein generating by the platform instance the set of contextual items comprises:
  extracting a token from the unstructured textual data; and
  referencing an ontology to determine whether the token matches an item in the ontology within a predetermined degree of certainty,
    wherein the set of contextual items includes an item descriptor class from the ontology.

* * * * *